US012688201B2

(12) United States Patent
Weitzman et al.

(10) Patent No.: US 12,688,201 B2
(45) Date of Patent: Jul. 21, 2026

(54) ACCORDION SPOKES SYSTEM

(71) Applicant: Cira Apps Limited, San Jose, CA (US)

(72) Inventors: Vernon L. Weitzman, Austin, CA (US); Maksym V. Chornodub, Dnipro (UA)

(73) Assignee: Cira Apps Limited, San Jose, CA (US)

( * ) Notice: Subject to any disclaimer, the term of this patent is extended or adjusted under 35 U.S.C. 154(b) by 0 days.

(21) Appl. No.: 18/888,139

(22) Filed: Sep. 17, 2024

(65) Prior Publication Data

US 2025/0013664 A1      Jan. 9, 2025

Related U.S. Application Data

(63) Continuation-in-part of application No. 17/959,638, filed on Oct. 4, 2022, now Pat. No. 12,124,479, which (Continued)

(51) Int. Cl.
*G06F 16/20* (2019.01)
*G06F 16/23* (2019.01)
(Continued)

(52) U.S. Cl.
CPC ........ *G06F 16/275* (2019.01); *G06F 16/2358* (2019.01); *G06F 16/288* (2019.01); *G06F 16/953* (2019.01)

(58) Field of Classification Search
CPC .. G06F 16/2358; G06F 16/275; G06F 16/288; G06F 16/953
See application file for complete search history.

(56) References Cited

U.S. PATENT DOCUMENTS 7,865,464 B2      1/2011   Walker
8,434,129 B2 *    4/2013   Kannappan ............ G06Q 10/10
                                                          726/22

(Continued)

FOREIGN PATENT DOCUMENTS

EP              4315811 B1       12/2025
WO      WO-2022213080 A1   10/2022

OTHER PUBLICATIONS

"U.S. Appl. No. 17/657,192, Notice of Allowance mailed Sep. 28, 2022", 11 pgs.

(Continued)

*Primary Examiner* — Diedra McQuitery
(74) *Attorney, Agent, or Firm* — Schwegman Lundberg & Woessner, P.A.

(57) ABSTRACT

A method of synchronizing a plurality of end points is disclosed. A collection of data sources is created. One or more spokes is automatically generated based on the collection of data sources. Each of the one or more spokes corresponds to one or more corresponding members of the collection. Personalized synchronization of one or more data items is performed for each spoke of the one or more spokes. The one or more data items are filtered based on properties specific to the one or more corresponding members of the collection. The one or more spokes are dynamically updated in response to one or more changes in the collection. The dynamic updating includes adding or removing at least one of the one or more spokes based on one or more modifications to one or more members of the collection.

20 Claims, 21 Drawing Sheets

Related U.S. Application Data is a continuation of application No. 17/657,192, filed on Mar. 30, 2022, now Pat. No. 11,494,412.

(60) Provisional application No. 63/167,802, filed on Mar. 30, 2021.

(51) Int. Cl.
  *G06F 16/27* (2019.01)
  *G06F 16/28* (2019.01)
  *G06F 16/953* (2019.01)

(56) References Cited

U.S. PATENT DOCUMENTS

| | | | | |
|---|---|---|---|---|
| 11,494,412 | B2 | 11/2022 | Weitzman et al. | |
| 12,124,479 | B2 | 10/2024 | Weitzman et al. | |
| 2003/0126137 | A1 | 7/2003 | Mcfadden | |
| 2005/0044197 | A1 | 2/2005 | Lai | |
| 2005/0055382 | A1 | 3/2005 | Ferrat et al. | |
| 2006/0031266 | A1 | 2/2006 | Colbeck et al. | |
| 2006/0215569 | A1 | 9/2006 | Khosravy et al. | |
| 2012/0284229 | A1 | 11/2012 | Kim et al. | |
| 2013/0046771 | A1* | 2/2013 | Moitra | G06F 16/951 |
| | | | | 707/E17.084 |
| 2014/0173702 | A1* | 6/2014 | Wong | H04L 63/0281 |
| | | | | 726/4 |
| 2016/0092540 | A1 | 3/2016 | Bihani et al. | |
| 2018/0260409 | A1 | 9/2018 | Sundar et al. | |
| 2019/0303373 | A1 | 10/2019 | Patel et al. | |
| 2019/0324704 | A1 | 10/2019 | Nam | |
| 2021/0117328 | A1 | 4/2021 | Chen et al. | |
| 2021/0218802 | A1* | 7/2021 | Shanker | G06F 21/6218 |
| 2022/0318268 | A1 | 10/2022 | Weitzman et al. | |
| 2023/0092339 | A1 | 3/2023 | Weitzman et al. | |

OTHER PUBLICATIONS

"U.S. Appl. No. 17/959,638, Non Final Office Action mailed Feb. 15, 2024", 15 pgs.

"U.S. Appl. No. 17/959,638, Non Final Office Action mailed Apr. 28, 2023", 11 pgs.

"U.S. Appl. No. 17/959,638, Notice of Allowance mailed Jun. 17, 2024", 13 pgs.

"U.S. Appl. No. 17/959,638, Preliminary Amendment filed Dec. 9, 2022", 7 pgs.

"U.S. Appl. No. 17/959,638, Response filed May 15, 2024 to Non Final Office Action mailed Feb. 15, 2024", 12 pgs.

"U.S. Appl. No. 17/959,638, Response filed Sep. 27, 2023 to Non Final Office Action mailed Apr. 28, 2023", 11 pgs.

"Canadian Application Serial No. 3,213,054, Office Action mailed Oct. 17, 2023", 6 pgs.

"Canadian Application Serial No. 3,213,054, Response filed Feb. 15, 2024 to Office Action mailed Oct. 17, 2023", 13 pgs.

"European Application Serial No. 22720542.4, Response filed Mar. 20, 2024 to Communication pursuant to Rules 161(1) and 162 EP mailed Nov. 8, 2023", 14 pgs.

"International Application Serial No. PCT/US2022/071431, International Preliminary Report on Patentability mailed Oct. 12, 2023", 8 pgs.

"International Application Serial No. PCT/US2022/071431, International Search Report mailed Jul. 21, 2022", 5 pgs.

"International Application Serial No. PCT/US2022/071431, Written Opinion mailed Jul. 21, 2022", 6 pgs.

"U.S. Appl. No. 17/959,638, Supplemental Notice of Allowability mailed Sep. 25, 2024", 3 pgs.

"International Application Serial No. PCT/US2025/046726, International Search Report mailed Dec. 23, 2025", 3 pgs.

"International Application Serial No. PCT/US2025/046726, Written Opinion mailed Dec. 23, 2025", 10 pgs.

"European Application Serial No. 25224738.2, Extended European Search Report mailed Jan. 30, 2026", 6 pgs.

"Canadian Application Serial No. 3,213,054, Examiners Rule 862 Report mailed Feb. 5, 2026", 5 pgs.

"Canadian Application Serial No. 3,213,054, Response filed Jun. 5, 2026 to Examiners Rule 86(2) Report mailed Feb. 5, 2026", 11 pgs.

* cited by examiner

300

RECEIVE A REQUEST TO CREATE A HUB — 302

DETERMINE A TYPE OF OBJECTS TO SYNCHRONIZE — 304

DETERMINE AN ORIGIN OF A FIRST SPOKE — 306

DETERMINE A SOURCE TYPE OF THE FIRST SPOKE — 308

DETERMINE A CONTAINER OF A SET OF OBJECTS CORRESPONDING TO THE SOURCE TYPE — 310

CREATE THE HUB — 312

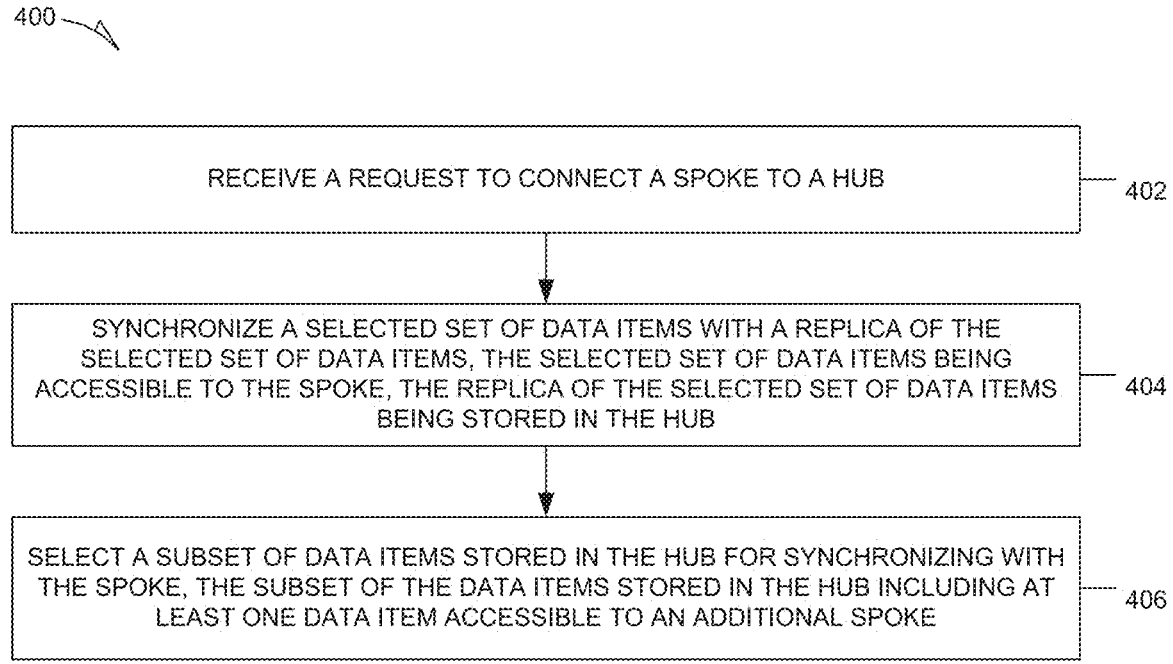

400

RECEIVE A REQUEST TO CONNECT A SPOKE TO A HUB ⸻ 402

SYNCHRONIZE A SELECTED SET OF DATA ITEMS WITH A REPLICA OF THE SELECTED SET OF DATA ITEMS, THE SELECTED SET OF DATA ITEMS BEING ACCESSIBLE TO THE SPOKE, THE REPLICA OF THE SELECTED SET OF DATA ITEMS BEING STORED IN THE HUB ⸻ 404

SELECT A SUBSET OF DATA ITEMS STORED IN THE HUB FOR SYNCHRONIZING WITH THE SPOKE, THE SUBSET OF THE DATA ITEMS STORED IN THE HUB INCLUDING AT LEAST ONE DATA ITEM ACCESSIBLE TO AN ADDITIONAL SPOKE ⸻ 406

RECEIVE A REQUEST TO DISCONNECT A SPOKE FROM THE HUB — 502

REMOVE A SUBSET OF THE DATA STORED IN THE HUB, THE SUBSET CORRESPONDING TO A REPLICA OF DATA ITEMS OWNED BY THE SPOKE — 504

PROVIDE AN UPDATE TO AN ADDITIONAL SPOKE BASED ON THE REMOVING OF THE SUBSET OF THE DATA STORED IN THE HUB — 506

600 —

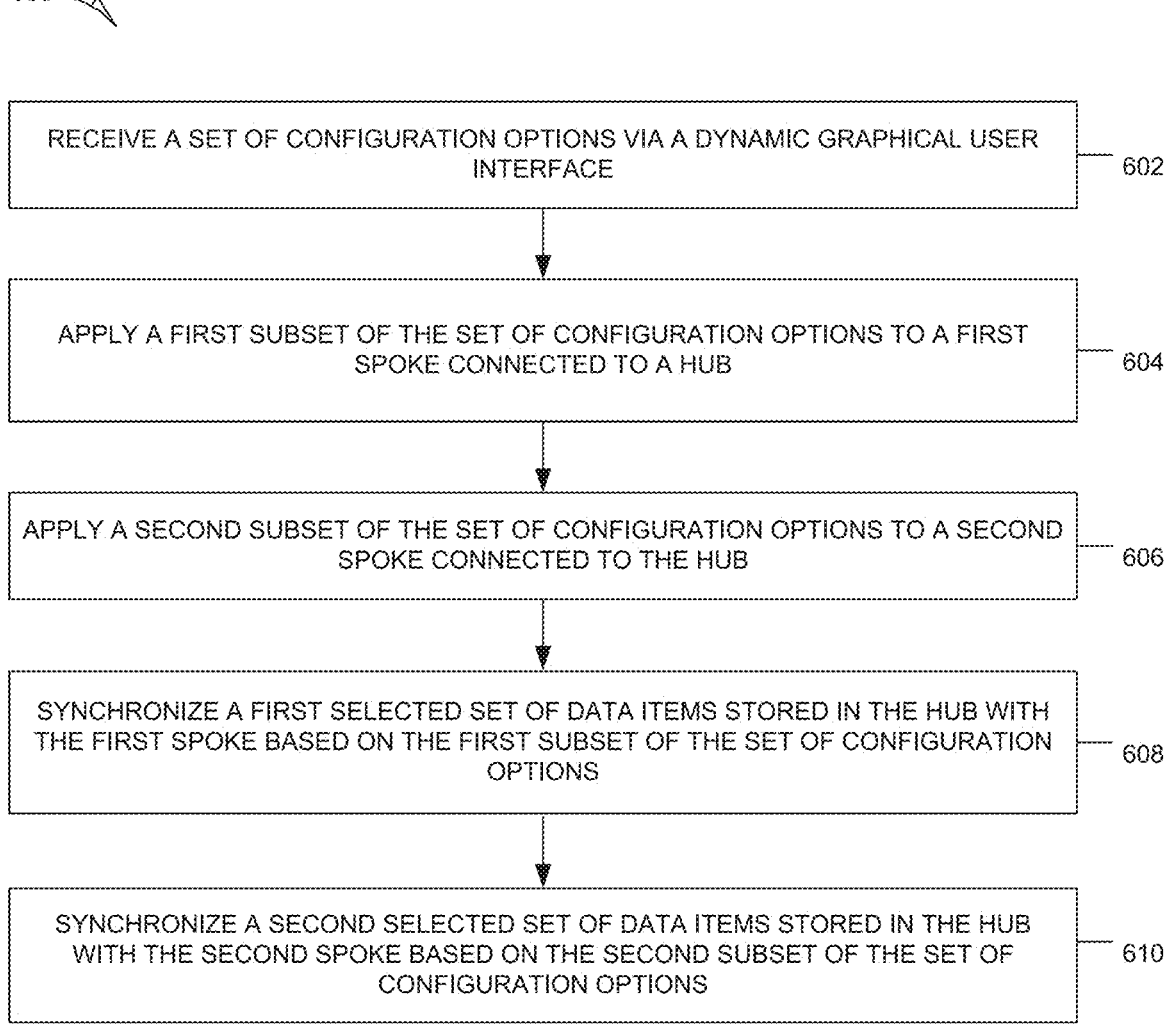

RECEIVE A SET OF CONFIGURATION OPTIONS VIA A DYNAMIC GRAPHICAL USER INTERFACE ⎯ 602

APPLY A FIRST SUBSET OF THE SET OF CONFIGURATION OPTIONS TO A FIRST SPOKE CONNECTED TO A HUB ⎯ 604

APPLY A SECOND SUBSET OF THE SET OF CONFIGURATION OPTIONS TO A SECOND SPOKE CONNECTED TO THE HUB ⎯ 606

SYNCHRONIZE A FIRST SELECTED SET OF DATA ITEMS STORED IN THE HUB WITH THE FIRST SPOKE BASED ON THE FIRST SUBSET OF THE SET OF CONFIGURATION OPTIONS ⎯ 608

SYNCHRONIZE A SECOND SELECTED SET OF DATA ITEMS STORED IN THE HUB WITH THE SECOND SPOKE BASED ON THE SECOND SUBSET OF THE SET OF CONFIGURATION OPTIONS ⎯ 610

*FIG. 6*

1100 — itrezzo + CiraSync (VLW) Sync Optrions 📅                                              ✕

Figure 11:
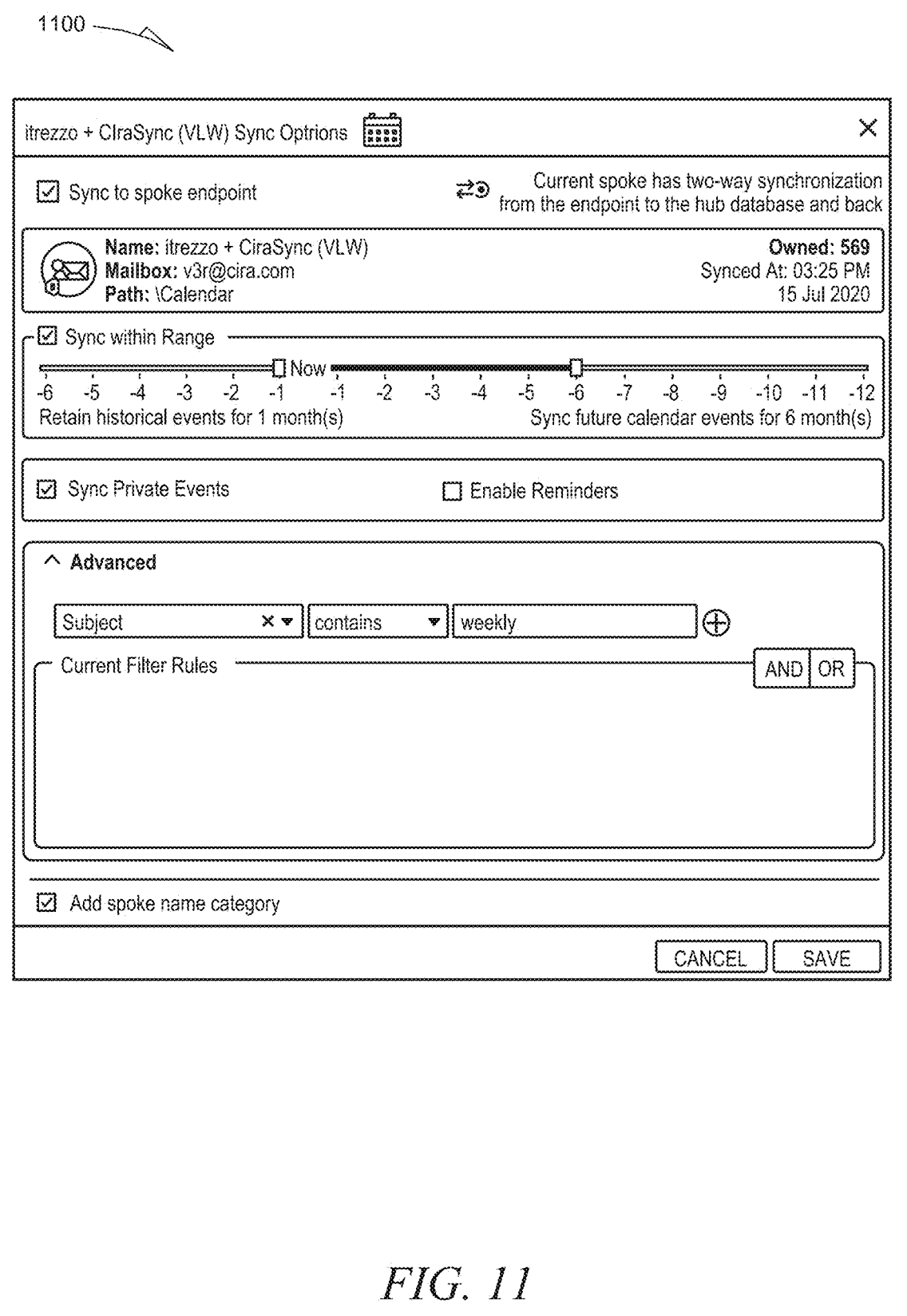

☑ Sync to spoke endpoint          ⇄⑨   Current spoke has two-way synchronization
                                          from the endpoint to the hub database and back ┌─────────────────────────────────────────────────────────────────────────┐
│  (icon)   Name: itrezzo + CiraSync (VLW)          Owned: 569        │
│           Mailbox: v3r@cira.com                  Synced At: 03:25 PM    │
│           Path: \Calendar                              15 Jul 2020      │
└─────────────────────────────────────────────────────────────────────────┘

┌─ ☑ Sync within Range ──────────────────────────────────────────────────┐
│                          ☐ Now                                            │
│   ├──────────────────────┤━━━━━━━━━━━━━━━━━━━━━━☐━━━━━━━━━━━━━━━━━━━━━┤   │
│   -6  -5  -4  -3  -2  -1      -1  -2  -3  -4  -5  -6  -7  -8  -9 -10 -11 -12│
│   Retain historical events for 1 month(s)    Sync future calendar events for 6 month(s)│
└─────────────────────────────────────────────────────────────────────────┘

┌─────────────────────────────────────────────────────────────────────────┐
│  ☑ Sync Private Events              ☐ Enable Reminders                    │
└─────────────────────────────────────────────────────────────────────────┘

┌─────────────────────────────────────────────────────────────────────────┐
│  ⋀ Advanced                                                               │
│                                                                           │
│   ┌──────────────────┬─┐ ┌──────────────┬─┐ ┌────────────────────┐        │
│   │ Subject      ✕ ▼ │ │ contains    ▼ │ │ weekly             │  ⊕       │
│   └──────────────────┴─┘ └──────────────┴─┘ └────────────────────┘        │
│  ┌─ Current Filter Rules ──────────────────────────────┌─────┬─────┐─┐    │
│  │                                                     │ AND │ OR  │ │    │
│  │                                                     └─────┴─────┘ │    │
│  │                                                                   │    │
│  │                                                                   │    │
│  │                                                                   │    │
│  │                                                                   │    │
│  └───────────────────────────────────────────────────────────────────┘    │
│                                                                           │
│  ☑ Add spoke name category                                                │
└─────────────────────────────────────────────────────────────────────────┘
                                               ┌──────────┐ ┌──────────┐
                                               │  CANCEL  │ │   SAVE   │
                                               └──────────┘ └──────────┘

Figure 15:
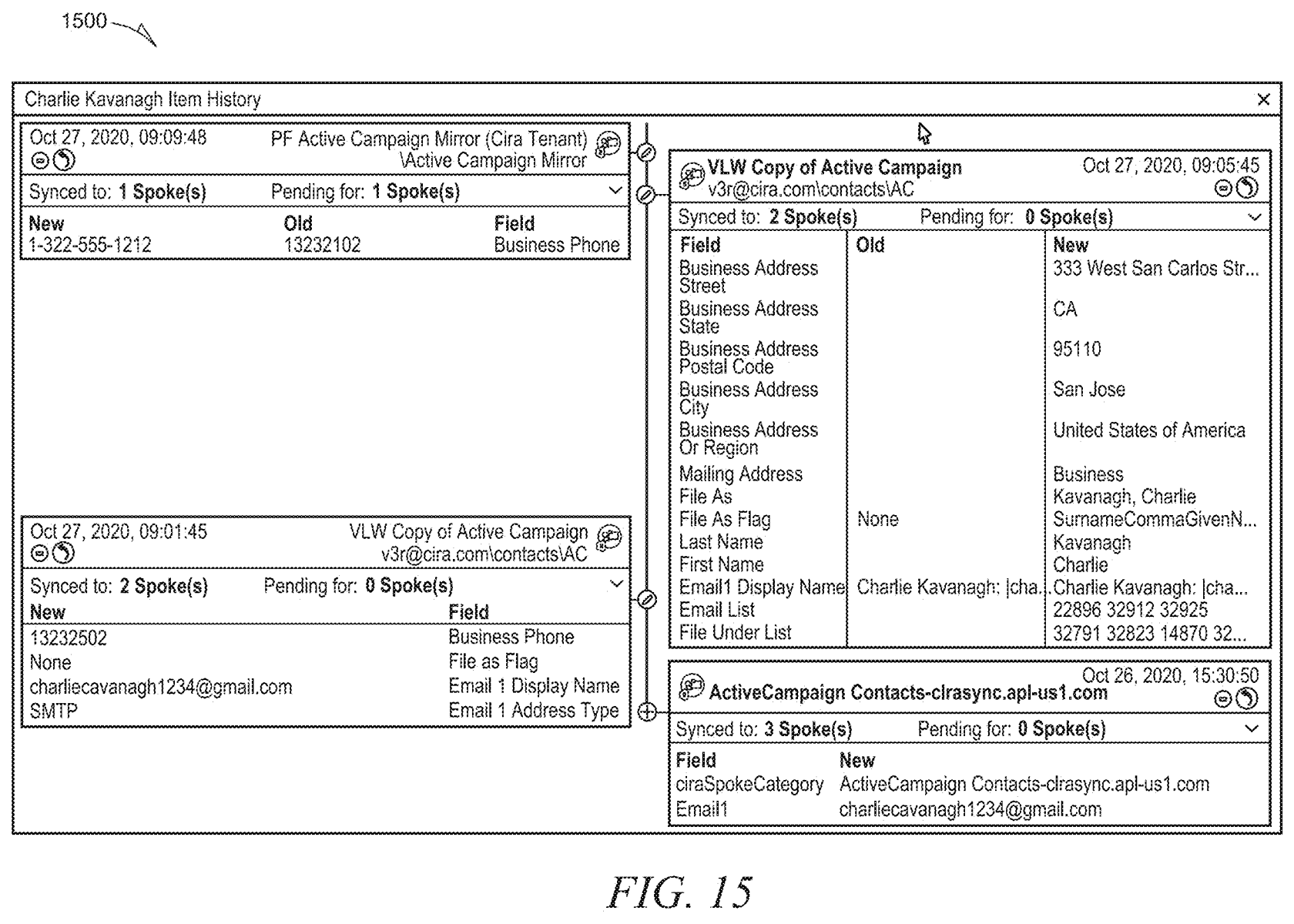

Charlie Kavanagh Item History

---

PF Active Campaign Mirror (Cira Tenant)
\Active Campaign Mirror

Oct 27, 2020, 09:09:48

Synced to: 1 Spoke(s)     Pending for: 1 Spoke(s)

| New | Old | Field |
|---|---|---|
| 1-322-555-1212 | 13232102 | Business Phone |

---

VLW Copy of Active Campaign
v3r@cira.com\contacts\AC

Oct 27, 2020, 09:01:45

Synced to: 2 Spoke(s)     Pending for: 0 Spoke(s)

| New | Field |
|---|---|
| 13232502 | Business Phone |
| None | File as Flag |
| charliecavanagh1234@gmail.com | Email 1 Display Name |
| SMTP | Email 1 Address Type |

---

VLW Copy of Active Campaign
v3r@cira.com\contacts\AC

Oct 27, 2020, 09:05:45

Synced to: 2 Spoke(s)     Pending for: 0 Spoke(s)

| Field | Old | New |
|---|---|---|
| Business Address Street | | 333 West San Carlos Str... |
| Business Address State | | CA |
| Business Address Postal Code | | 95110 |
| Business Address City | | San Jose |
| Business Address Or Region | | United States of America |
| Mailing Address | | Business |
| File As | | Kavanagh, Charlie |
| File As Flag | None | SurnameCommaGivenN... |
| Last Name | | Kavanagh |
| First Name | | Charlie |
| Email1 Display Name | Charlie Kavanagh: |cha... | Charlie Kavanagh: |cha... |
| Email List | | 22896 32912 32925 |
| File Under List | | 32791 32823 14870 32... |

---

ActiveCampaign Contacts-cirasync.api-us1.com

Oct 26, 2020, 15:30:50

Synced to: 3 Spoke(s)     Pending for: 0 Spoke(s)

| Field | New |
|---|---|
| ciraSpokeCategory | ActiveCampaign Contacts-cirasync.api-us1.com |
| Email1 | charliecavanagh1234@gmail.com |

Figure 17:
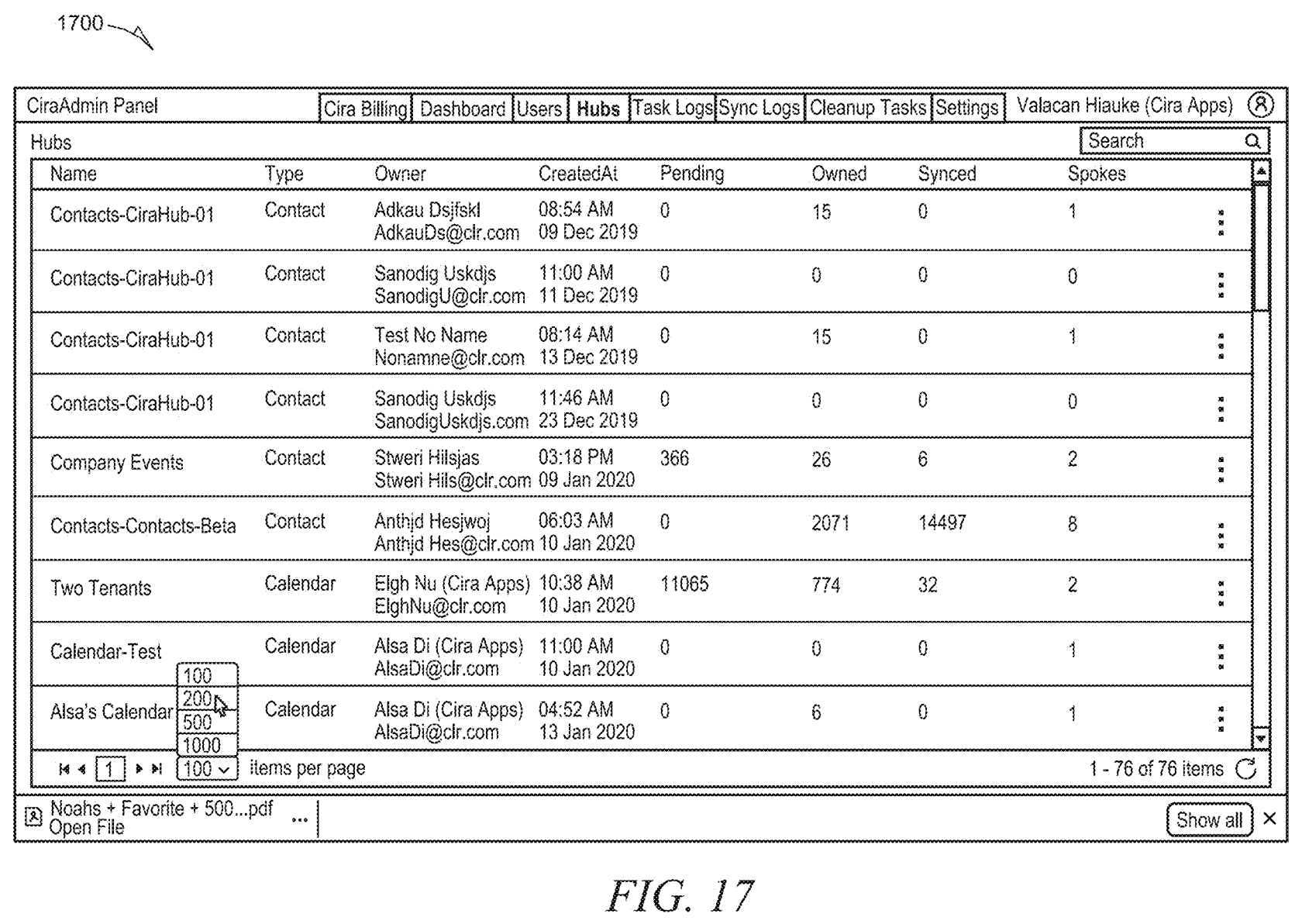

CiraAdmin Panel    | Cira Billing | Dashboard | Users | Hubs | Task Logs | Sync Logs | Cleanup Tasks | Settings | Valacan Hiauke (Cira Apps)   ⊗

Hubs

Search   Q

| Name | Type | Owner | CreatedAt | Pending | Owned | Synced | Spokes | |
|---|---|---|---|---|---|---|---|---|
| Contacts-CiraHub-01 | Contact | Adkau Dsjfskl AdkauDs@clr.com | 08:54 AM 09 Dec 2019 | 0 | 15 | 0 | 1 | ... |
| Contacts-CiraHub-01 | Contact | Sanodig Uskdjs SanodigU@clr.com | 11:00 AM 11 Dec 2019 | 0 | 0 | 0 | 0 | ... |
| Contacts-CiraHub-01 | Contact | Test No Name Nonamne@clr.com | 08:14 AM 13 Dec 2019 | 0 | 15 | 0 | 1 | ... |
| Contacts-CiraHub-01 | Contact | Sanodig Uskdjs SanodigUskdjs.com | 11:46 AM 23 Dec 2019 | 0 | 0 | 0 | 0 | ... |
| Company Events | Contact | Stweri Hilsjas Stweri Hils@clr.com | 03:18 PM 09 Jan 2020 | 366 | 26 | 6 | 2 | ... |
| Contacts-Contacts-Beta | Contact | Anthjd Hesjwoj Anthjd Hes@clr.com | 06:03 AM 10 Jan 2020 | 0 | 2071 | 14497 | 8 | ... |
| Two Tenants | Calendar | Elgh Nu (Cira Apps) ElghNu@clr.com | 10:38 AM 10 Jan 2020 | 11065 | 774 | 32 | 2 | ... |
| Calendar-Test | Calendar | Alsa Di (Cira Apps) AlsaDi@clr.com | 11:00 AM 10 Jan 2020 | 0 | 0 | 0 | 1 | ... |
| Alsa's Calendar | Calendar | Alsa Di (Cira Apps) AlsaDi@clr.com | 04:52 AM 13 Jan 2020 | 0 | 6 | 0 | 1 | ... |

|◄ ◄ 1 ► ►|   100 ˅ items per page     1 - 76 of 76 items 100
200
500
1000

Show all

Noahs + Favorite + 500...pdf   ...

Open File

| Details | Owned by  CiraSync-GAL | ✕ | max.suvakewa@cirasync.com
☐ Show Empty Fields

| Field | Value |
| --- | --- |
| Uid | aeeb2b66-1289-4e61-bc49-33b1ec984cd |
| CiraHubGuid | 85008951-3ab9-4aa7-a4d1-fb90fa89e857 |
| CiraSpokeGuid | 3f7ba9a3-ddd3-4ddd-bc05-85a2142ae91f |
| DisplayName | Max Suvakewa |
| Categories | CiraSync-GAL |
| Email1 | max.suvakewa@cirasync.com |

ACCORDION SPOKES SYSTEM

PRIORITY APPLICATIONS

This application is a continuation-in-part of U.S. patent application Ser. No. 17/959,638, filed Oct. 4, 2022, which is a continuation of U.S. patent application Ser. No. 17/657, 192, filed Mar. 30, 2022, which claims the benefit of U.S. Provisional Application Ser. No. 63/167,802, filed Mar. 30, 2021, each of which is incorporated herein by reference in its entirety.

TECHNICAL FIELD

The present application relates generally to the technical field of cloud-based software-as-service (SaaS) architectures and, in one specific example, to a hub-and-spoke cloud-based SaaS architecture and specialized administrative user interfaces for implementing automatic multipoint "n"-way synchronization of silos of information, including contact lists, calendars, or public folders, or directories between connected end points.

BACKGROUND

Conventional synchronization solutions typically allow connecting two end points, which means that multiple two-way synchronizations partnerships must be set up and managed individually. Other limitations include lack of change tracking, inability to easily recover from human errors of data destruction, lack of flexibility in roles-based administration, and inability to scale for organizations that have vastly different synchronization needs. Additionally, conventional synchronization solutions are often limited to work with only a small set of endpoint devices or applications.

BRIEF DESCRIPTION OF THE DRAWINGS

Some embodiments are illustrated by way of example and not limitation in the figures of the accompanying drawings.

FIG. 4 is a flowchart illustrating example operations of a method of implementing a hub-and-spoke synchronization architecture.

FIG. 6 is a flowchart illustrating example operations of a method of applying configuration options to a hub-and-spoke synchronization architecture.

FIG. 11 is a screenshot of an example dynamic graphical user interface for setting synchronization options for a spoke.

FIG. 13 is a screenshot of an example dynamic graphical user interface depicting synchronization of items for an endpoint represented as a spoke in the hub-and-spoke architecture.

FIG. 14 is screenshot of an example dynamic graphical user interface for viewing or modifying a history of change logs corresponding to synchronization of data items between a hub and one or more spokes.

FIG. 15 is a screenshot of an example of an example dynamic graphical user interface for viewing or modifying a detailed change log corresponding to a history of synchronization actions taken with respect to one data item in the history of change logs.

FIG. 17 is a screenshot of an example dynamic graphical user interface for viewing a listing of hubs in an administration panel corresponding to the hub-and-spoke synchronization architecture.

DETAILED DESCRIPTION

Figure 1:
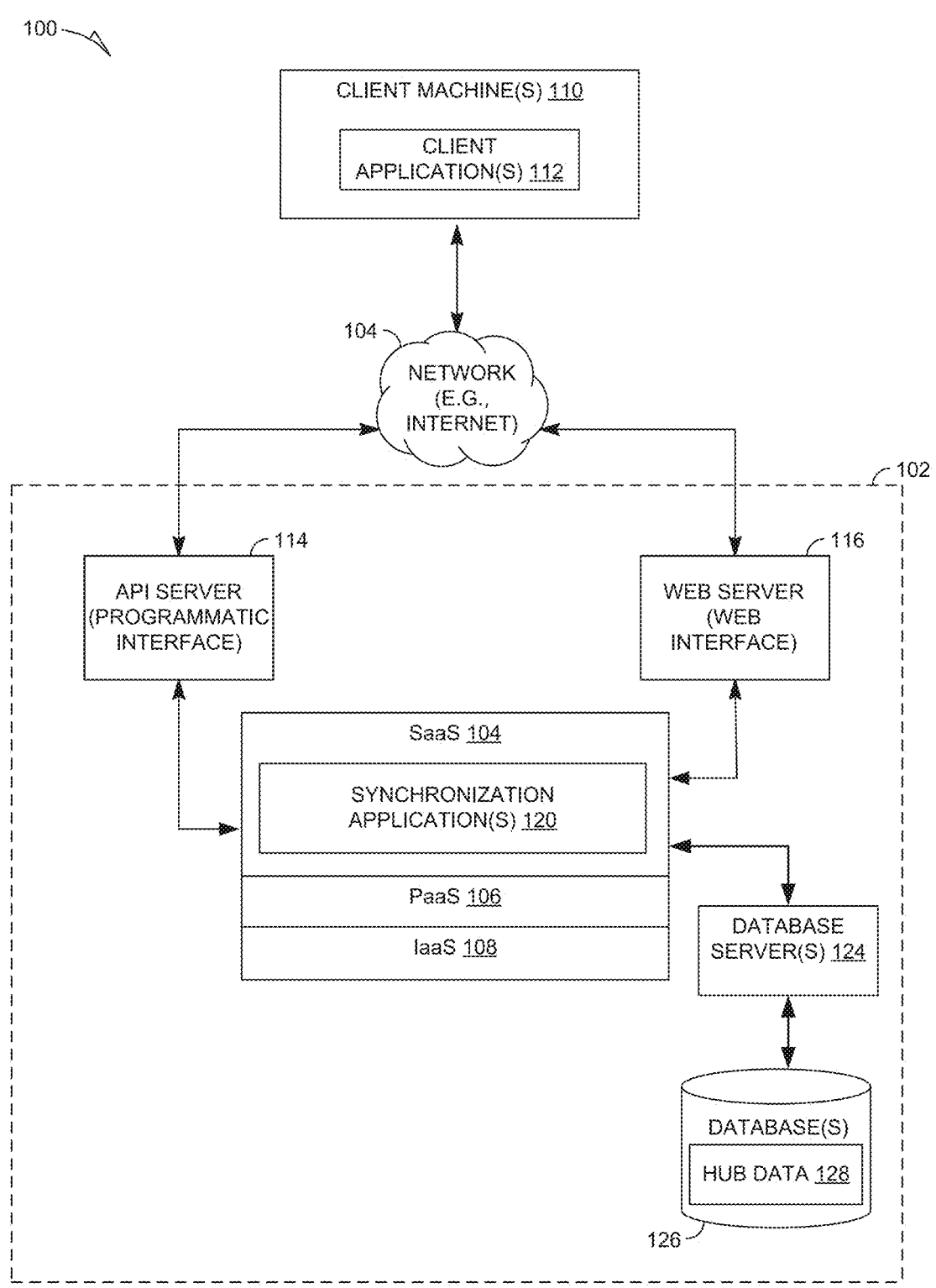
FIG. 1 is a network diagram depicting a cloud-based SaaS system within which various example embodiments may be deployed.

In the following description, for purposes of explanation, numerous specific details are set forth in order to provide an understanding of various embodiments of the present subject matter. It will be evident, however, to those skilled in the art that various embodiments may be practiced without these specific details.

A method of synchronizing a plurality of end points is disclosed. A spoke is connected to a hub. The spoke corresponds to one of a plurality of devices, services, or applications. The connecting of the spoke to the hub includes performing inbound synchronization of all of a set of data items or a subset of the set of data items with a replica. All of the set of data items or the subset of the set of data items is accessible to the hub and the replica is stored in the hub. One or more additional spokes are connected to the hub. The one or more additional spokes correspond to an additional one of the plurality of devices, services, or applications. The connecting of the one or more additional spokes to the hub includes performing inbound synchronization of all of an additional set of data items or a subset of the additional set of data items with an additional replica. All of the additional set of data items or the subset of the additional set of data items is accessible to the hub and the additional replica is stored in the hub. A subset of a set of data items stored in the replica or the additional replica is selected for outbound synchronization with any of a plurality of spokes (e.g., except a spoke from which the subset of data items originated). The plurality of spokes includes the spoke and the one or more additional spokes. The outbound synchronization of the subset of the set of data items stored in the replica or the additional replica with any of the plurality of spokes is performed. The performing of the outbound synchronization includes tracking the outbound synchronization of each of the subset of the set of data items in a change log or snapshot in real time during the performing of the outbound synchronization.

In example embodiments, the spoke corresponds to an endpoint of a plurality of endpoints and the additional spoke corresponds to an additional endpoint of the plurality of endpoints. Thus, the synchronization of the spokes includes synchronizing data across a plurality of endpoints. In example embodiments, one or more of the plurality of endpoints is a mobile device, such as a mobile phone.

In example embodiments, a spoke maps to a user's personal repository. For example, a spoke could map to a contact folder or calendar in a user mailbox. However, spokes can also represent applications or cloud services that are not specific to a user. For example, a spoke may map to a company calendar that is shared by an entire company. One more staff members may create and edit items on that calendar. Thus, spokes may represent a user, but they may also represent an application or shared repository.

In example embodiments, when a spoke is connected, inbound synchronization (from the spoke to a hub) occurs, but no outbound synchronization (from a hub to a spoke) occurs. Later, a selected subset of data stored in the hub may be synchronized with a spoke via outbound synchronization. In example embodiments, this selected subset is selected via a user interface (e.g., by a user or an administrator). In example embodiments, the selected subset may be automatically selected (e.g., based on one more filters).

In example embodiments, upon disconnection of a spoke, the hub removes all of the items that were replicated in the spoke. In example embodiments, a user may be asked if they want to "orphan" or "remove" contacts owned by the hub.

In example embodiments, each spoke "owns" the contacts that are in existence when a spoke is added. It also owns items created directly in the spoke by external applications connected to the spoke. Thus, owned items are retained by the spoke after disconnection. Changes made to the attributes of original (owned) items by the hub may be retained. In example embodiments, the hub tracks ownership so it can remove exactly the hub-created items in a spoke.

A method of synchronizing a plurality of end points is disclosed. A collection of data sources is created. The collection includes at least one of an individual data source, a group of data sources, a nested collection, or an exclusion. One or more spokes is automatically generated based on the collection of data sources. Each of the one or more spokes corresponds to one or more corresponding members of the collection. Personalized synchronization of one or more data items is performed for each spoke of the one or more spokes. The one or more data items are filtered based on properties specific to the one or more corresponding members of the collection. The one or more spokes are dynamically updated in response to one or more changes in the collection. The dynamic updating includes adding or removing at least one of the one or more spokes based on one or more modifications to one or more members of the collection.

FIG. 1 is a network diagram depicting a system 100 within which various example embodiments may be deployed. A networked system 102, in the example form of a cloud computing service, such as Microsoft Azure or other cloud service, provides server-side functionality, via a network 104 (e.g., the Internet or Wide Area Network (WAN)) to one or more endpoints (e.g., client machines 110). FIG. 1 illustrates client application(s) 112 on the client machines 110. Examples of client application(s) 112 may include a web browser application, such as the Internet Explorer browser developed by Microsoft Corporation of Redmond, Washington or other applications supported by an operating system of the device, such as applications supported by Windows, iOS or Android operating systems. Examples of such applications include e-mail client applications executing natively on the device, such as an Apple Mail client application executing on an iOS device, a Microsoft Outlook client application executing on a Microsoft Windows device, or a Gmail client application executing on an Android device. Examples of other such applications may include calendar applications and file sharing applications. Each of the client application(s) 112 may include a software application module (e.g., a plug-in, add-in, or macro) that adds a specific service or feature to the application.

An API server 114 and a web server 116 are coupled to, and provide programmatic and web interfaces respectively to, one or more software services, which may be hosted on a software-as-a-service (SaaS) layer or platform 104. The SaaS platform may be part of a service-oriented architecture, being stacked upon a platform-as-a-service (PaaS) layer 106 which, may be, in turn, stacked upon a infrastructure-as-a-service (IaaS) layer 108 (e.g., in accordance with standards defined by the National Institute of Standards and Technology (NIST)).

While the applications 120 are shown in FIG. 1 to form part of the networked system 102, in alternative embodiments, the applications 120 may form part of a service that is separate and distinct from the networked system 102.

Further, while the system 100 shown in FIG. 1 employs a cloud-based architecture, various embodiments are, of course, not limited to such an architecture, and could equally well find application in a client-server, distributed, or peer-to-peer system, for example. The various server applications 120 could also be implemented as standalone software programs. Additionally, although FIG. 1 depicts machines 110 as being coupled to a single networked system 102, it will be readily apparent to one skilled in the art that client machines 110, as well as client applications 112, may be coupled to multiple networked systems, such as payment applications associated with multiple payment processors or acquiring banks (e.g., PayPal, Visa, MasterCard, and American Express).

Web applications executing on the client machine(s) 110 may access the various applications 120 via the web interface supported by the web server 116. Similarly, native applications executing on the client machine(s) 110 may accesses the various services and functions provided by the applications 120 via the programmatic interface provided by the API server 114. For example, the third-party applications may, utilizing information retrieved from the networked system 102, support one or more features or functions on a website hosted by the third party. The third-party website may, for example, provide one or more promotional, marketplace or payment functions that are integrated into or supported by relevant applications of the networked system 102.

The server applications 120 may be hosted on dedicated or shared server machines (not shown) that are communicatively coupled to enable communications between server machines. The server applications 120 themselves are communicatively coupled (e.g., via appropriate interfaces) to each other and to various data sources, so as to allow information to be passed between the server applications 120 and so as to allow the server applications 120 to share and access common data. The server applications 120 may furthermore access one or more databases 126 via the database servers 124. In example embodiments, various data items are stored in the database(s) 126, such as hub data items 128. In example embodiments, the hub data items may be collected from information silos on spokes connected to the hub. In example embodiments, the information silos may correspond to one or more of contact lists, global address lists (GALs), calendars, public folders, directories, SharePoint objects, Dynamics CRM objects, SQL Server objects, and so on, at least portions of which are configured (e.g., via synchronization application(s) 120) to be synchronized across multiple clients, as explained in more detail below.

Navigation of the networked system 102 may be facilitated by one or more navigation applications. For example, a search application (as an example of a navigation application) may enable keyword searches of data items included in the one or more database(s) 126 associated with the networked system 102. A browser application may allow users to browse data structures according data items that are classified into information silos as hub data 128. Various other navigation applications may be provided to supplement the search and browsing applications.

Figure 2:
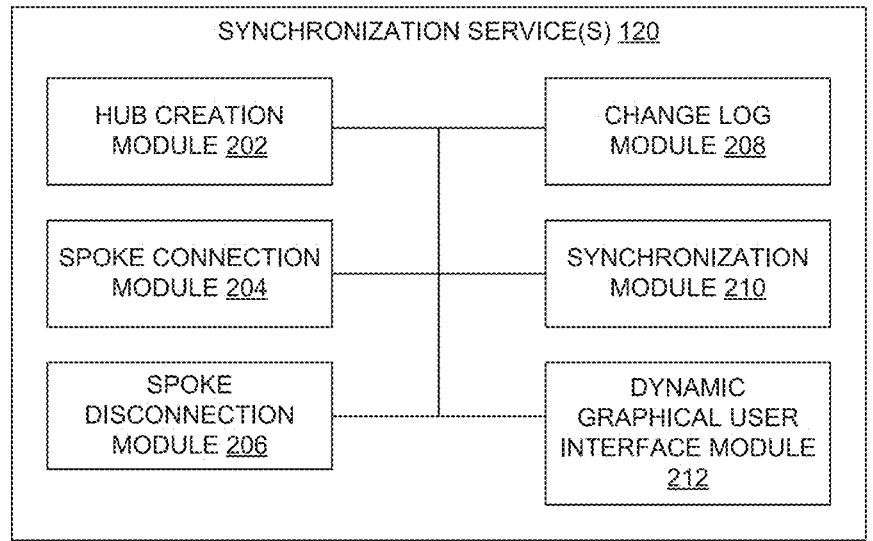
FIG. 2 is a block diagram illustrating example modules of the synchronization applications of FIG. 1.

FIG. 2 is a block diagram illustrating example modules of the synchronization service(s) 120. A hub creation module 202 is configured to create one or more hubs, as described in more detail below. A spoke connection module 204 is configured to connect one or more spokes to one or more hubs, as described in more detail below. A spoke disconnection module 206 is configured to disconnect one or more spokes from one or more hubs, as described in more detail below. A change log module is configured to generate change logs based on changes to a set of data items stored in hub, as described in more detail below. A synchronization module 210 is configured to synchronize the spokes connected to the hub (e.g., based on one or more configuration options specified for each of the spokes), as described in more detail below. A dynamic graphical user interface module 212 is configured to generate and cause user interfaces to be presented for viewing and dynamically modifying the one or more hubs and one or more spokes (e.g., in real time), as described in more detail below.

Figure 3:
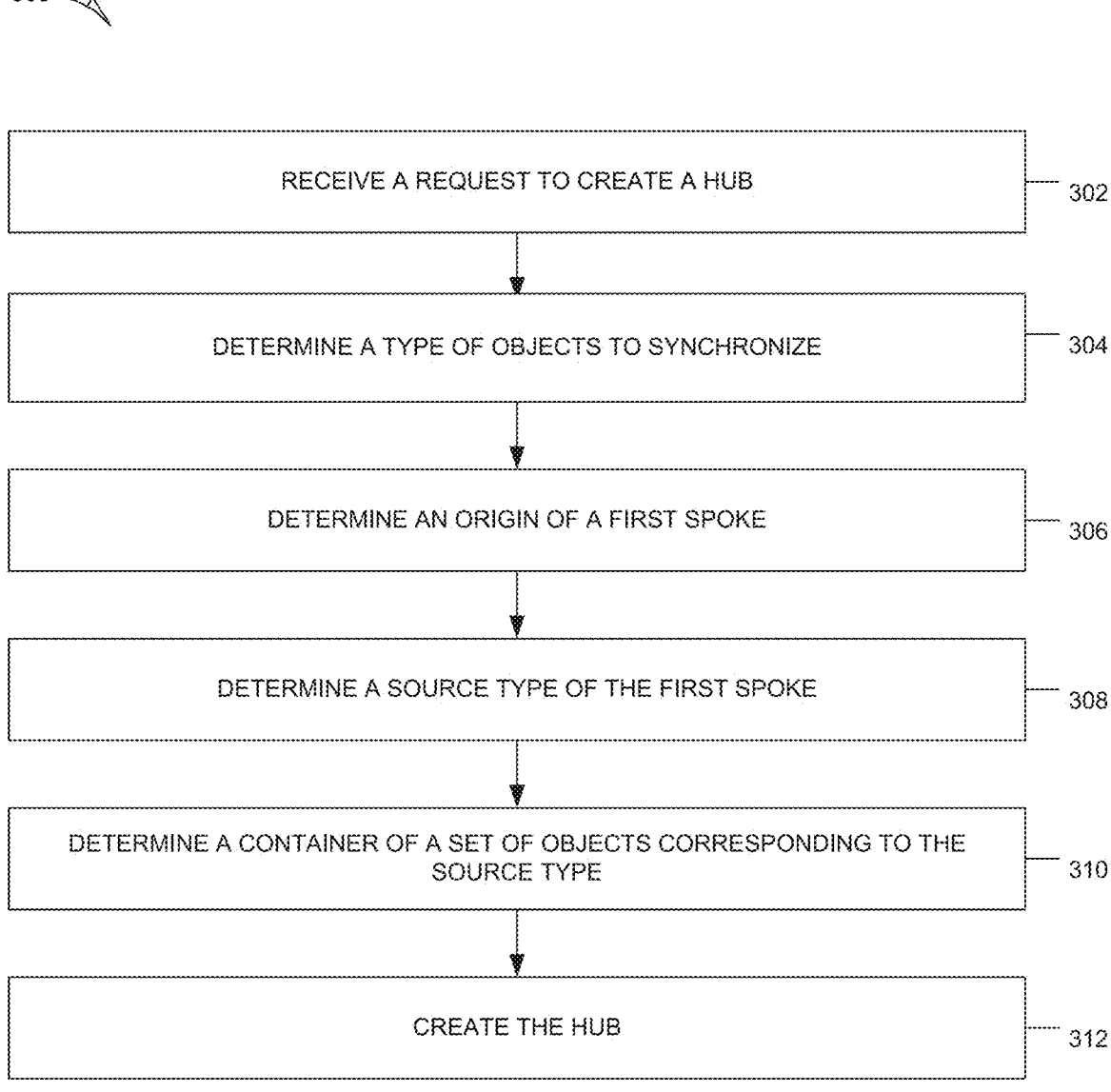
FIG. 3 is a flowchart illustrating example operations of a method of creating a hub.

FIG. 3 is a flowchart illustrating example operations of a method 300 of creating a hub. In example embodiments, the method 300 is performed by one or more of the modules of FIG. 2. At operation 302, a request is received to create a hub. For example, a user may request creation of a new hub via a dynamic graphical user interface, such as the user interface depicted in FIG. 8. In example embodiments, the dynamic graphical user interface (e.g., a hub creation wizard) may be accessible and invoked via a dashboard, such as a dashboard that comprises a web page that is accessible via URL. For example, an option to create the hub may be provided via a selectable user interface element (e.g., a creation icon) of the user interface, which causes the hub creation wizard to start. In example embodiments, the user may be required to sign into the hub-and-spoke synchronization platform to access the hub creation functionality. In example embodiments, the dashboard may be configured to incorporate a single sign-on feature, such as the single sign-on feature of Microsoft 365 or Office 365 deployments. In other words, a user may be able to sign into the dashboard using the same user name and password that the user uses to access other services within the cloud into which the hub-and-spoke synchronization workers are deployed (e.g., the user may sign into the dashboard using the user's Office 365 e-mail address and password).

At operation 304, a type of the objects (e.g., data items) that are to be synchronized is determined. In example embodiments, the type of the objects corresponds to one or more information silos that are accessible to or stored on one or more spokes that may be configured to be connected to the hub. Such information silos may correspond to calendars, contacts, emails, notes, tasks, and so on, such as any of the information silos defined or supported by the cloud services platform on which the hub-and-spoked synchronizations services are deployed. In example embodiments, the type of the object may be made by activating one or more user interface elements of a dynamic user interface of a wizard that is invoked from the dashboard by the hub creation request.

At operation 306, an origin of a spoke that is to be connected to the hub is determined. In example embodiments, origins may include cloud-specific data sources. For example, for a hub-and-spoke synchronization system deployed in a Microsoft Azure or other cloud service, origins of the spoke may include (1) Microsoft Exchange data sources, Microsoft Office data sources, CRM (e.g., SalesForce) data sources, or other application data sources.

In example embodiments, the origin corresponds to a tenant associated with the spoke. For example, an origin may be selected from an existing tenant associated with the user, another tenant (e.g., separate from the user), or a server. Thus, for example, for a hub-and-spoke system deployed in a Microsoft Azure cloud, the origin of the spoke may be selected from Office 365 in the user's tenant, Office 365 in another tenant, an Exchange Server, or a Salesforce CRM (see, e.g., FIG. 8).

In example embodiments, the selection of the origin may be made by activating one or more user interface elements of a dynamic user interface of a wizard that is invoked from the dashboard by the hub creation request. For an origin that corresponds to a separate server, such as an Exchange server, the user may be provided with an option to invite a user from another tenant or supply another tenant's credentials. If choosing to supply another tenant's credentials, the user may be prompted (e.g., via a separate screen of the wizard) to specify source data credentials for the server, such as one or more of a name, a description, a user name, a password, a domain, a URL, and a version of the server and then grant access to the user from the other tenant (e.g., by activating a user interface element, such as the "Grant Access" button shown in FIG. 9). In example embodiments, the specified credentials may be safeguarded for use in the cloud services platform, such as by using the Microsoft Azure Key Vault.

At operation 308, a source type of the spoke is determined. In example embodiments, the source type may be selected from a list of source types that correspond to the selected object type. For example, for a contact object type, possible spoke source types may include a public folder, a user mailbox, and a Global Address List (e.g., see the source types depicted in FIG. 8). In example embodiments, object types may include GALs (e.g., Microsoft Office 365 GALs and/or Microsoft Exchange Server GALs), mailboxes (e.g., Microsoft 365 mailboxes and/or Microsoft Exchange Server mailboxes), personal folders (e.g., Microsoft Office 365 personal folders and/or Microsoft Exchange server personal folders), presentation data (e.g., Microsoft SharePoint data), CRM data (e.g., Microsoft Dynamics 365 data or SalesForce data), database data (e.g., Microsoft SQL Server data), synchronization application data (e.g., PieSync data), folder/directory data, and so on. In example embodiments, a selection of the source type may be made by activating one or more user interface elements of a dynamic user interface of the hub creation wizard that correspond to each possible object type within the deployment environment.

At operation 310, a container of a set of objects corresponding to the source type is determined. For example, in example embodiments, based on a selection of a public folder source type, a navigable list of some or all of the public folders accessible to the user may be presented within the wizard, allowing the user to specify a selection of a folder or a set of object within a folder. As another example, based on a selection of a mailbox source type, a navigable list of all mailbox folders that are accessible to the user may be presented within the wizard. In example embodiments, the user may, for example, select a name of a person having a mailbox folder that is accessible to the user (e.g., in a first pane of a screen of the wizard) and then navigate (e.g., in a second pane of the screen of the wizard) accessible data items within the person's mailbox folder to select a data item matching the selected type of object (e.g., contacts) or a folder containing such data items.

At operation 312, a hub is created. In example embodiments, the creation of the hub may include prompting the user for a name of the hub as well as name of the spoke of the hub. Upon creation of the hub, in example embodiments, all or a selected set of data items corresponding to the selected container corresponding to the spoke may be automatically stored in the hub as a replica of the data items corresponding to the spoke.

In example embodiments, if a spoke cannot be validated (e.g., based on a failure to validate user credentials, a failure to connect, and so on), all the data collected by the wizard is saved. Upon a detection that the failure has been corrected, the hub may then be automatically created based on the saved data.

FIG. 4 is a flowchart illustrating example operations of a method of connecting a spoke to a hub. In example embodiments, the method 400 is performed by one or more of the modules of FIG. 2. At operation 402, a request to connect a spoke to a hub is received (e.g., via activation of a user interface element of the dashboard user interface discussed above).

At operation 404, a selected set of data items is synchronized with a replica of the selected set of data items. Here, the selected set of data items is accessible to the spoke and the replica of the selected set of data items is stored in the hub. In example embodiments, a one-way synchronization is performed, causing the replica to be created from scratch (e.g., an empty state) or replaced (e.g., overwritten) with the selected set of data items that accessible to the spoke. In example embodiments, the selected set of data items may be all or a selected subset the data items included in a container of data items that is compatible with the hub (e.g., based on a submission of the selected set of data items via a navigation user interface, such as the navigation user interface of the hub creation wizard discussed above). In example embodiments, metadata corresponding to the selected set of data items is stored in the hub. The metadata may specify ownership information associated with the data items. For example, the metadata may specify that one or more of the selected data items is owned by the spoke or a user associated with the spoke.

At operation 406, a subset of data items stored in the hub is selected for synchronizing with the spoke. In example embodiments, the subset of data items stored in the hub includes at least one data item from a replica of data items corresponding to an additional spoke, the replica of data items corresponding to the additional spoke having been previously created based on a connection of the additional spoke to the hub. In example embodiments, the at least one data item from the replica of data items corresponding to the additional spoke is selected based on one or more configuration options specifying a directional relationship between the spoke and the additional spoke or based on a specified filter, as discussed in more detail below. In example embodiments, various synchronization options may be set from a dynamic user interface, such as the user interface depicted in FIG. 10. Such synchronization options may include whether to synchronize to a spoke endpoint, a type of synchronization, whether to synchronize private events, whether to enable reminders, whether a spoke name category is added, and so on. In example embodiments, synchronization within a range may be enabled. When enabled, a user interface element, such as a slider control, may be used to specify a period (e.g., a number of months) of historical events to retain, and an additional user interface element may be used to specify a period of future calendar events to synchronize. Additionally, user interface elements may be used to add filter rules for the synchronization.

Figure 5:
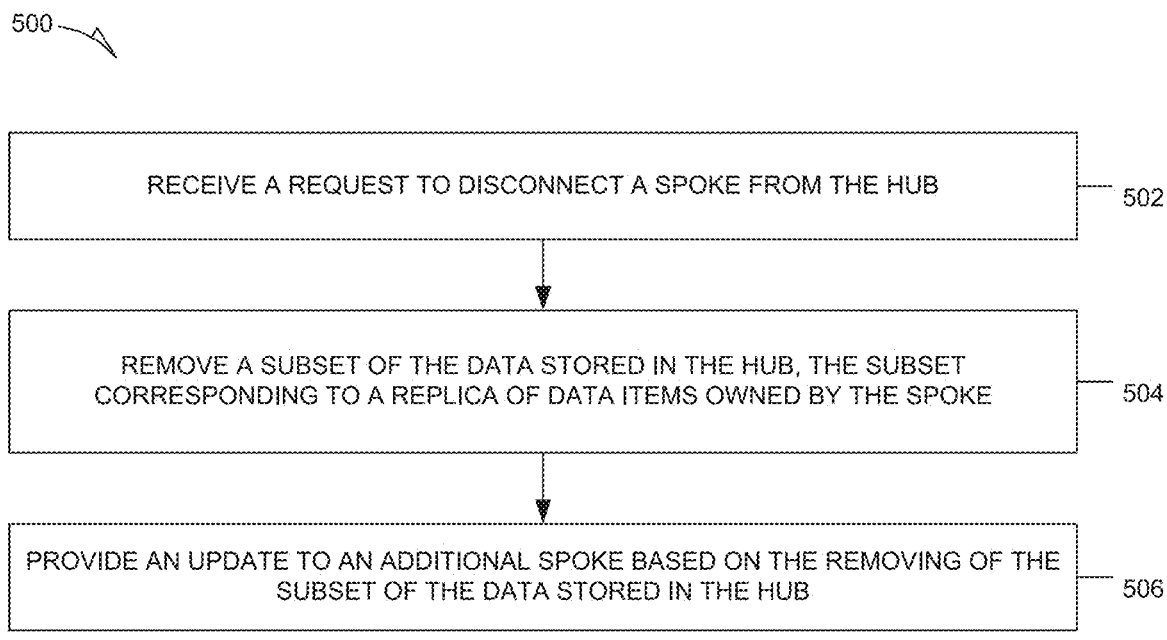
FIG. 5 is a flowchart illustrating example operations of a method of disconnecting a spoke from a hub.

FIG. 5 is a flowchart illustrating example operations of a method of disconnecting a spoke from a hub. In example embodiments, the method 500 is performed by one or more of the modules of FIG. 2. At operation 502, a request to disconnect a spoke from a hub is received (e.g., via activation of a user interface element of the dashboard user interface discussed above).

At operation 504, a subset of the data items stored in the hub is removed. In example embodiments, the subset corresponds to a replica of a set of data items stored in the hub, the replica corresponding to a set of data items accessible to the spoke that is to be removed. In example embodiments, the subset of the data stored in the hub that is removed is identified as belonging to or being owned by the spoke (or a user associated with the spoke) that is to be removed (e.g., based an analysis of metadata that is stored in the hub in conjunction with the replica of the set of data items).

At operation 506, an update or notification is provided to one or more additional spokes connected to the hub to indicate the removal of the subset of the data items stored in the hub. The one or more additional spokes may then be updated based on the update.

FIG. 6 is a flowchart illustrating example operations of a method of applying configuration options to a hub-and-spoke synchronization architecture. In example embodiments, the method 600 is performed by one or more of the modules of FIG. 2. At operation 602, a set of configuration options is received via a dynamic graphical user interface, such as the dashboard user interface described above. In example embodiments, a visual representation of the hub-and-spoke architecture may be presented within the dashboard, allowing selection of any of one or more hubs or one or more spokes associated with each hub. For example, the configuration options may include a subset of configuration options that is to be applied to a spoke connected to a hub and a subset of configuration options that is to be applied to an additional spoke connected to the hub.

In example embodiments, the configuration options may include a directional relationship for synchronization between a first spoke (e.g., spoke A) and a second spoke (e.g., spoke B) connected to the hub. The directional relationship may be selected from any of the following directional relationships. (1) One-way sync—spoke A is the primary and spoke B is always a replica. Here, changes made to spoke B are ignored and automatically overwritten. (2) Two-way sync (primary/secondary)—spoke A is the starting point and contains n items; Spoke B begins as an empty container; After spoke A and spoke B are in sync, changes made in spoke B are reflected in spoke A, and changes made in spoke A are reflected in spoke B. (3) Two-way sync multi-primary—spoke A and spoke B are both starting points. Spoke A contains x items. Spoke B contains y items. When these spokes are in sync, the count of items in each spoke is x+y. If two identical items originated in each spoke, they would now appear as duplicates in each spoke. (4) Two-way sync with contact and field merge—spoke A and spoke B both contain similar contacts; When contacts are showing in the hub, a merge and deduplication operation is performed automatically or by an operator (e.g., an administrator) directly from the hub (e.g., using Grid CRM). In example embodiments, fuzzy deduplication may be selected in which an operator is prompted via a graphical user interface (e.g., the dashboard interface discussed above) to merge imprecise duplicates The configuration options may also include a merge type for option (4) above. The merge type may be selected from any of the following merge types. (1) Exact Deduplication—field by field comparison; 100% match. May be allowed for object types of contacts, calendar, email, or notes. (2) Match by email address—email address is considered a reliable matching address. May be allowed for contacts. (3) Match by unique fields—A specified number of selected fields (e.g., three or more) must be matched, wherein the selected fields have a high probability of unique identification. May be allowed for contacts and calendars. (4) No conflict deduplication. May be allowed for contacts and calendars. (5) Conflicted deduplication.

In example embodiments, each spoke supports specification of filters so that a user can precisely control synchronization of objects that are relevant, minimize a performance impact of a synchronization, and control costs associated with accessing cloud resources. For example, a remote mailbox calendar with 5000 items could be filtered to only include 30 days of history and 12 months in the future. In example embodiments, the user may be able to set a threshold for maximum. In example embodiments, if the spoke has 200 appointments matching the criteria, only that small subset of items shall count towards hub item sync total (HIST), which is a total number of items synchronized in all spokes. When exceeded, sync will stop and an alert is provided to the customer (e.g., via the dashboard user interface). A default for HIST may be set (e.g., at 2× first sync HIST). In example embodiments, the dashboard user interface includes a reporting feature that allows the user to view the HIST for a hub in various ways (e.g., on each day of the month).

In example embodiments, whenever a spoke supports MIME attachments, they are synched to the hub. Additionally, whenever a spoke supports HTML text fields, they are synched to the hub.

In example embodiments, it is possible that the same item is changed by two users at different spokes at the same time. A collision interval window may be provided and configurable (e.g., with a default value set to, for example, 60 seconds. When an item is modified a second time in the collision interval window (only on a different spoke), the hub may check to see of the same attribute was changed in different spokes. If that is the case, an email alert may be sent to the designated hub contacts (e.g., via the dashboard) indicating a possible conflict. Item description and field changes may be indicated (e.g., in the alert and/or within the dashboard) with times of detected changes and the most recent changes made to the item.

In example embodiments, the hub-and-spoke architecture may include a pricing feature. For example, hub pricing to a customer may be on a prepay model that is similar to Partner DSU pricing. Each hub may incur a monthly charge to the tenant based on the total number of items synchronized in all spokes (e.g., the HIST). The HIST may be billed in granular chunks (e.g., of 400 items), rounded up to the nearest full chunk. However, each hub may have a minimum billing requirement of, for example, four chunks (or 1200 items). This may be called a Hub Chunk Unit (HCU). The HIST may be calculated periodically (e.g., each day) and reduce the available HCU balance. As with DSU's, there may be billing only for a first period (e.g., a first 25 days) of each month. HCU consumption can rise and fall each day as needed. The True up period is for consistency. Here's an example pricing formula:

$$\text{If HIST} <= 1200 \text{ THEN HCU} = 3$$

$$\text{ELSE HCU} = \text{INT}((\text{HIST} - 1)/400) + 1$$

In example embodiments, the creator of the hub is the owner of the hub. Administrative access may not be recreated to create the hub. However, the dashboard may have a special view for Global Administrators. The Global Administrator view will show an additional layer in the hierarchy.

In example embodiments, upon hub creation, a container will be created with the display name and email address of the owner. The container name can be renamed by the administrator and will only be visible to the administrator.

The administrator may automatically have view access to all hubs in all containers as well as access to create a new container or assign an owner (even an owner who has no global admin rights).

When viewing existing containers, there will be an option to add all Global Admins as hub administrator. However, if they wish full administrative access, a prompt like the following may appear:

When you assume the administrative role of a hub, the owner(s) of the hub will be notified via email. Do you still wish to add full control for all Global Admins?

If the Global Administrator takes control, the administrator may be able to take any of the following actions: Change hub (container) owner (to a user, or a group); move hubs in and out of containers; pause a spoke, or entire hub; add or remove spokes; remove and wipe synched contacts.

Figure 7:
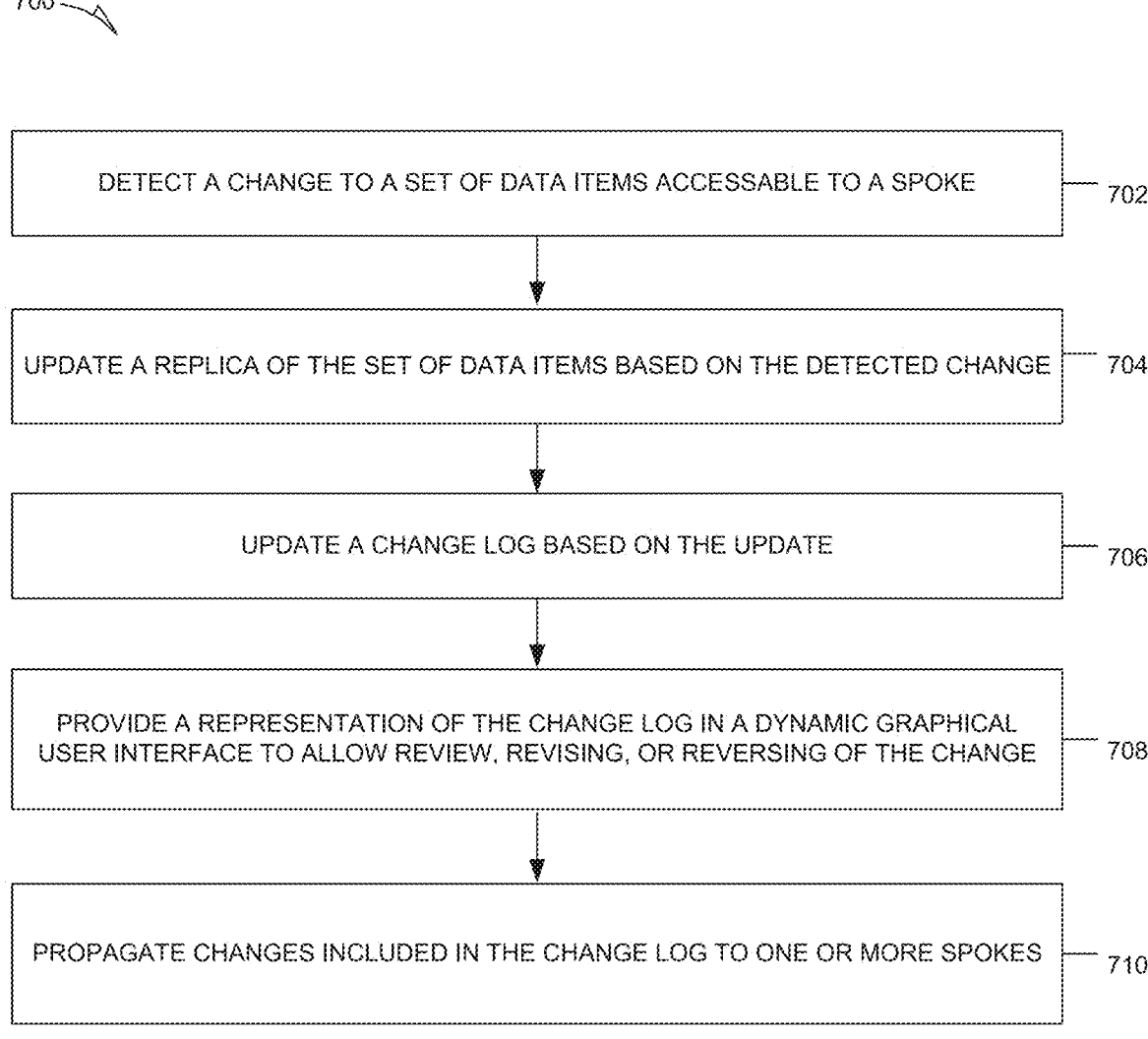
FIG. 7 is a flowchart of example operations for propagating changes included in a change log to one or more spokes.

FIG. 7 is an example user interface for updating a change log for a hub and providing a representation of the change log in a dynamic graphical user interface for modification (e.g., in real-time). In example embodiments, the method 700 is performed by one or more of the modules of FIG. 2. At operation 702, a change to a set of data items accessible to a spoke connected to a hub is detected. For example, it may be detected that a contact in a personal contact list that is accessible to the spoke has been modified, removed, or added.

At operation 704, a replica of the set of data items is updated, the replica being stored in the hub.

At operation 706, a change log is updated based on the update to the replica of the set of data items.

At operation 708, a representation of the change log is presented in a dynamic graphical user interface (e.g., in real time). For example, the representation of the change log may be presented in the dashboard user interface. The dynamic graphical user interface may provide user interface elements for reviewing, revising, or reversing the change (e.g. in real time) by an administrator of the hub.

At operation 710, the changes included in the change log are propagated to one or more spokes. In example embodiments, the change log allows for efficient synchronization of spokes that are unreachable for extended amounts of time, allowing all of the changes to be applied when the spokes come back online. For example, in a multi-spoke system, some spokes may be online while others are offline. When a synchronization action occurs and is added to the change logs, the change may be reflected in near real-time for spokes that are online. For spokes that are offline, the change may be reflected in those spokes as soon as the spokes come back online. In this case, the change log is checked and any changes that were not recorded in the spoke while the spoke was offline may be played back on the spoke, bringing the spoke back into synchronization with the hub and the other spokes.

In example embodiments, for a remote data source that is cached, the dashboard can be used to add a contact list with a hub connector as a data source. Dozens or hundreds of users can then receive a one-way replica of the contact list.

Figure 8:
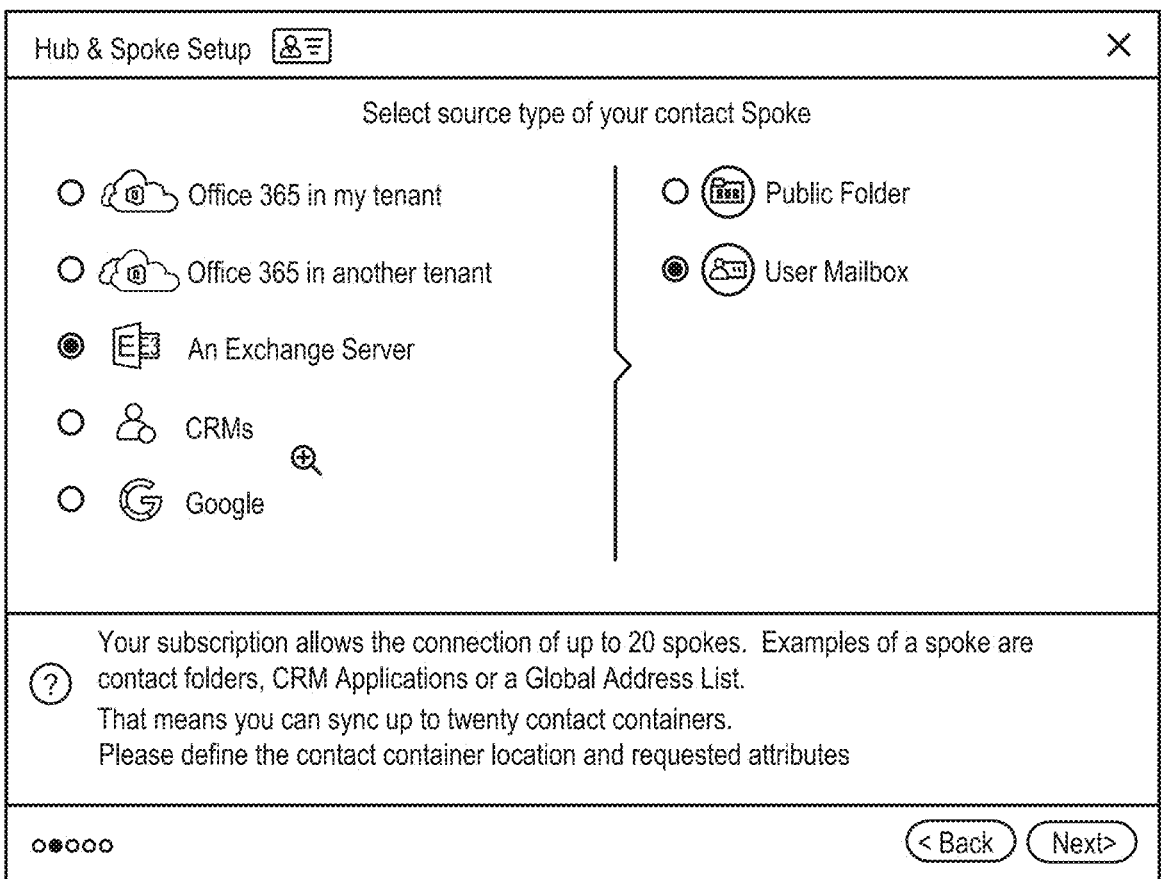
FIG. 8 is a screenshot of an example dynamic graphical user interface of a screen of a wizard for creating or setting up a hub.

FIG. 8 is an example dynamic graphical user interface of a screen of a wizard for creating or setting up a hub. As shown, the dynamic graphical user interface includes user interface elements for specifying a source type of a contact spoke and for specifying a location of a contact container. In example embodiments, a source type may be selected from available source types, which may include, for example, Office 365 in a user's current tenant, Office 365 in another user's tenant, an Exchange Server, CRMs, or Google source types. Depending on which source type is selected, a sub-type corresponding to the source type may also be selected. Thus, for example, as depicted in FIG. 8, when an Exchange Server source type is selected, the user may be able to select a Public Folder or a User Mailbox.

Figure 9:
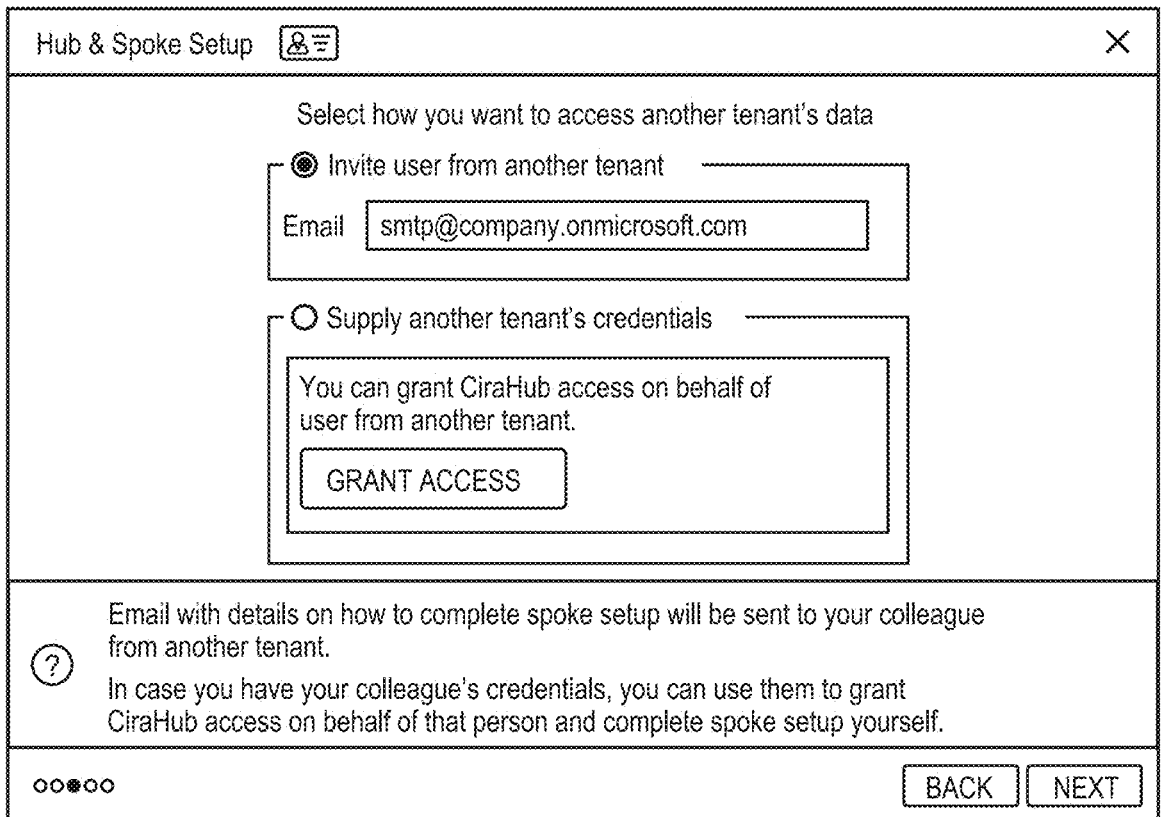
FIG. 9 is a screenshot of an example dynamic graphical user interface of an additional screen of a wizard for creating or setting up a hub.

FIG. 9 is an example dynamic graphical user interface of an additional screen of a wizard for creating or setting up a hub. As shown, the dynamic graphical user interface includes user interface elements for selecting whether to invite a user, either from the same tenant (intra-tenant) or from another tenant (inter-tenant), or supply another tenant's credentials. When supplying another tenant's credentials, the graphical user interface includes a user interface element for granting access on behalf of the user from the other tenant.

Figure 10:
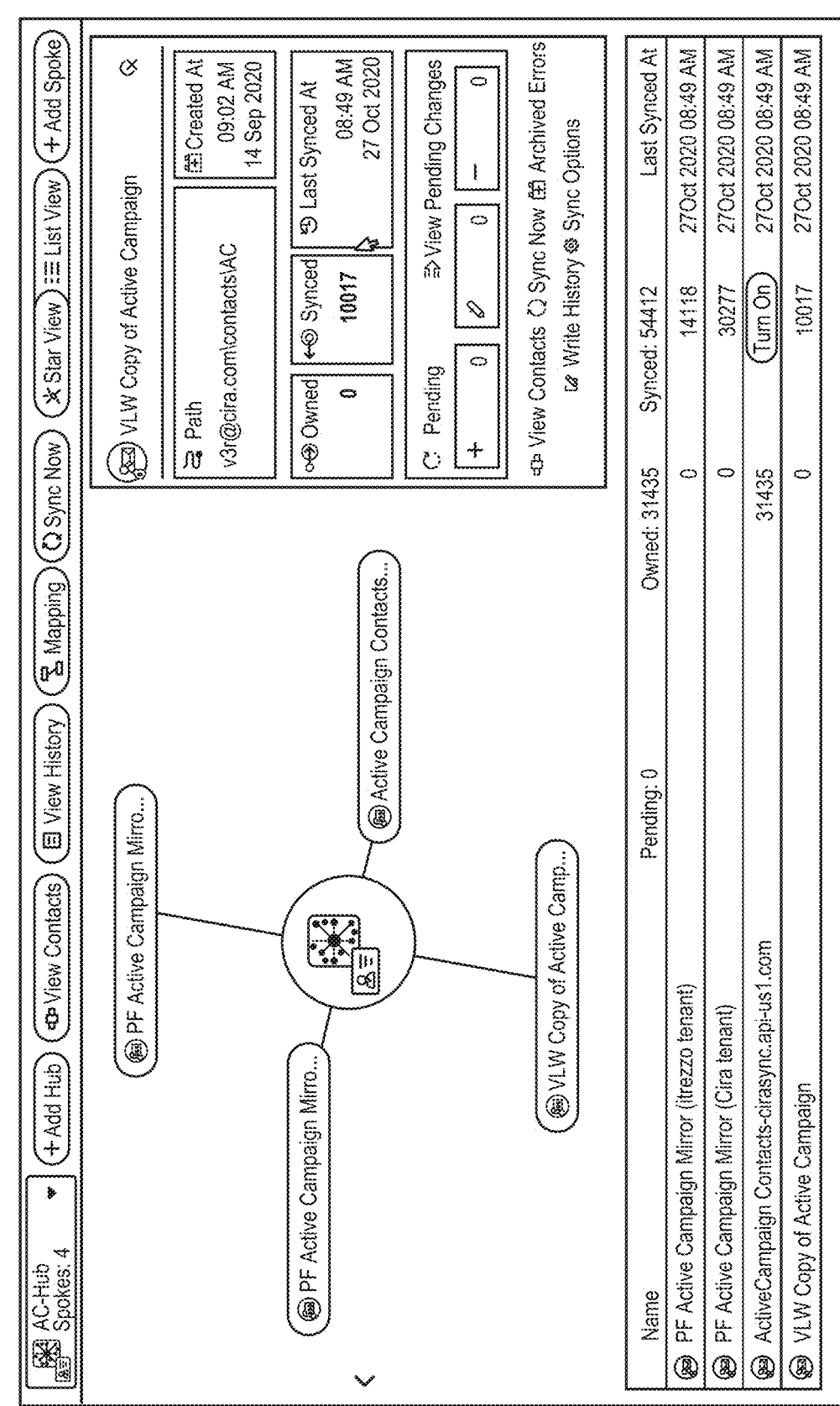
FIG. 10 is a screenshot of an example dynamic graphical user interface for configuring a hub-and-spoke synchronization architecture.

FIG. 10 is an example dynamic graphical user interface for viewing and configuring a hub-and-spoke synchronization system. In example embodiments, the user interface is presented and controlled by one or more of the modules of FIG. 2. As depicted, a hub has been created for multiple spokes. Here, the spokes represent a Contacts List, a copy of the Contacts list, and mirrors of the Contacts List for two different tenants. As such, as indicated, the Contacts List spoke owns a set of data items that have been stored in a replica on the hub. Different subsets of the set of data items are then synchronized from the hub to the copy and the mirrors (e.g., according to one or more synchronization options, as described in more detail below). In example embodiments, the Contacts List may be a contacts list of an organization or an individual. As described above, the hub stores one or more replicas, including a replica corresponding to each of the sets of data items that are accessible to each of the spokes (or subsets of the sets of data items). The spokes are then each separately synchronized with configurable sets of data stored in the replica (e.g., according to one or more configuration options, as described above). Various user interface elements may be accessed to specify configuration options for the hub itself or for individual spokes connected to the hub; or to, for example, export, clean, or delete individual spokes.

In example embodiments, a user interface element allows synchronization to be turned on or turned off for each spoke (e.g., with a single click). As depicted, the synchronization of the Contacts List has been currently turned off; thus, a button is provided for turning the synchronization on. In example embodiments, the dynamic graphical user interface is updated in real time. For example, as depicted, based on a selection of the spoke corresponding to the copy of the Contacts List in the user interface, a region of the user interface is updated in real time to show, for example, pending synchronization actions. In example embodiments, a history of synchronization actions with respect to the selected spoke can be accessed for viewing or editing the synchronization actions, as described in more detail below.

Various data pertaining to each spoke can be viewed or edited within the user interface, including a path to a storage location corresponding to the spoke, a creation date of the spoke, ownership data pertaining to the spoke, a number of items synchronized to the spoke, a last date or time of synchronization, a number of pending synchronization items, and so on.

In example embodiments, synchronization can be immediately triggered for a spoke through selection of a user interface option (e.g., Sync Now). Thus, for example, if synchronization for a spoke is delayed (e.g., based on prioritization of the synchronization actions across the system), a single click of this user interface element can force synchronization for the spoke to be moved to the front of the queue.

In example embodiments, user interface elements are provided for adding a hub or adding a spoke to the currently viewed hub. Additionally, user interface elements are provided for viewing more specific data pertaining to the hub or each of its spokes, as described in more detail below.

FIG. 11 is an example of a dynamic graphical user interface for setting various synchronization options for a spoke. As shown, such synchronization options may include whether to synchronize to a spoke endpoint, a type of synchronization, whether to synchronize private events, whether to enable reminders, whether a spoke name category is added, and so on. In example embodiments, synchronization within a range may be enabled. When enabled, a user interface element, such as a slider control, may be used to specify a period (e.g., a number of months) of historical events to retain, and an additional user interface element may be used to specify a period of future calendar events to synchronize. Additionally, user interface elements may be used to add filter rules for the synchronization.

Figure 12:
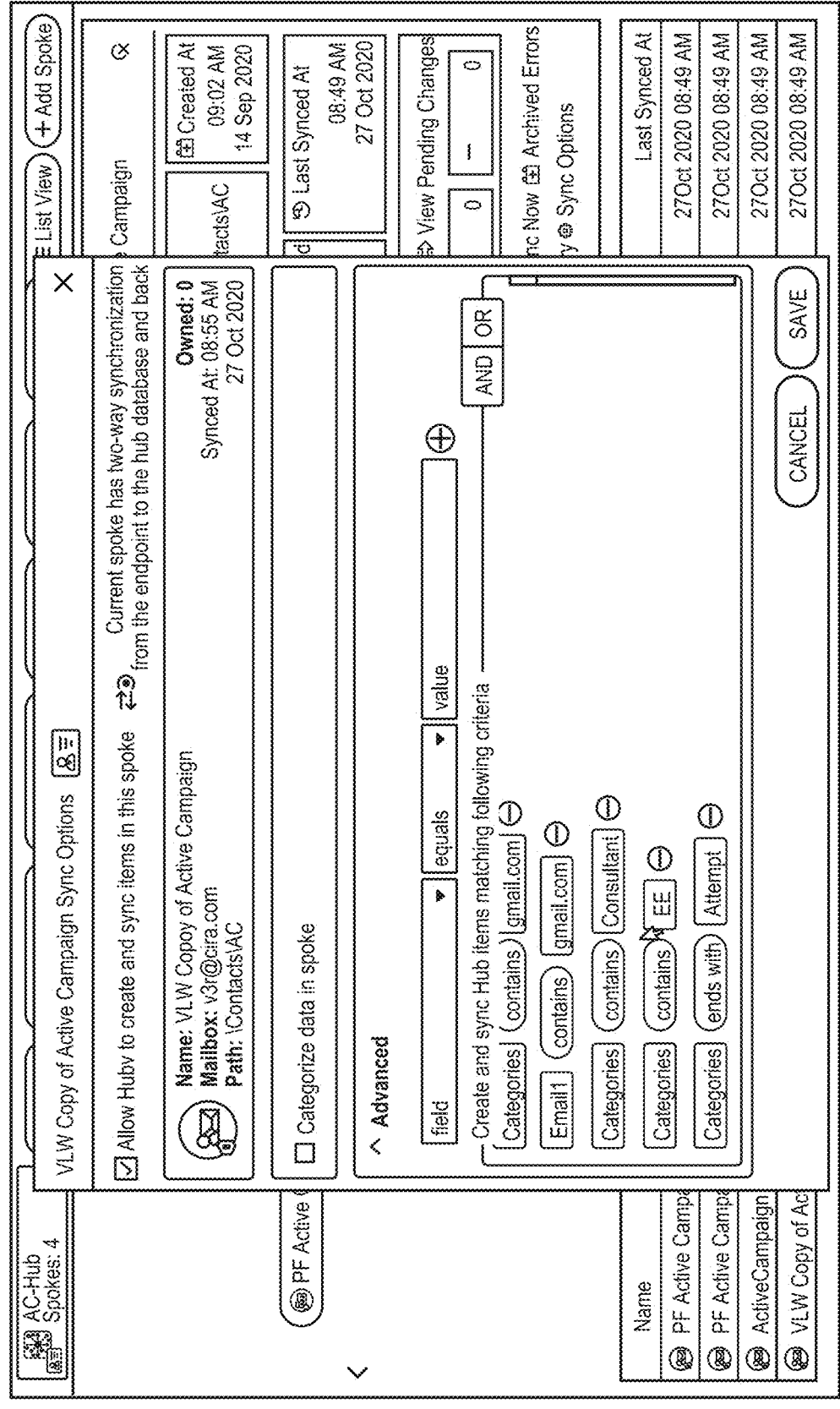
FIG. 12 is a screenshot of an example dynamic graphical user interface for setting additional synchronization options for a spoke.

FIG. 12 is screenshot of an example dynamic graphical user interface for setting additional synchronization options for a spoke. As depicted, various advanced filter criteria are specified for synchronization. Only those data items from the hub that match the filter criteria will be synchronized to the spoke. As depicted, in example embodiments, dynamic user interface elements are included in the user interface to easily remove, add, or combine various filter criteria. In example embodiments, user interface elements may be provided for specifying a type of synchronization, grant permissions for the synchronization, and categorize data, as described herein.

Figure 13:
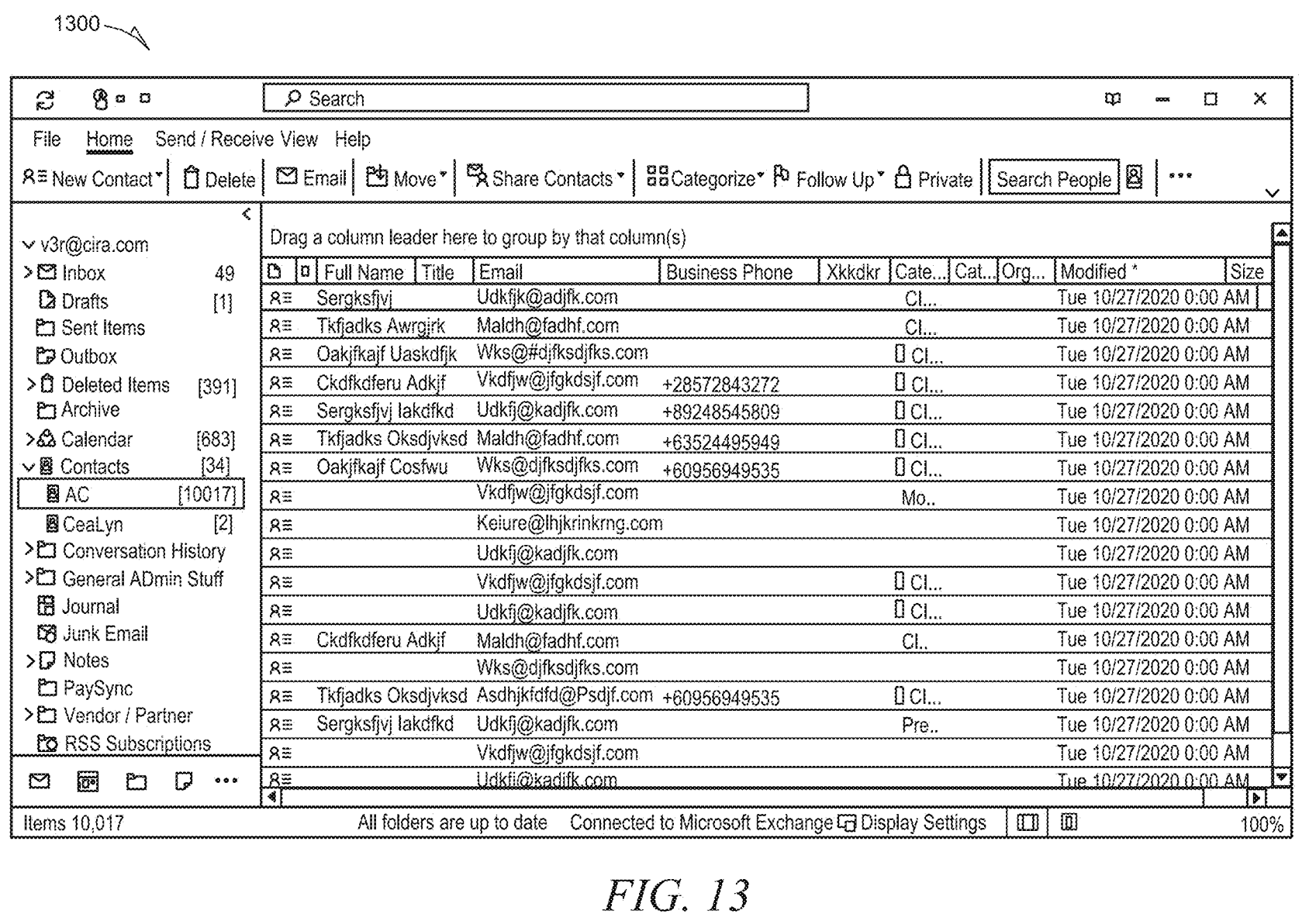

FIG. 13 is a screenshot of an example dynamic graphical user interface for a location corresponding to a spoke. Here, the location is a Contacts folder ("AC") corresponding to a user of Microsoft Outlook. As depicted, various data items have been synchronized into the specified Contacts folder in accordance with the synchronization options for the spoke that represents the location.

Figure 14:
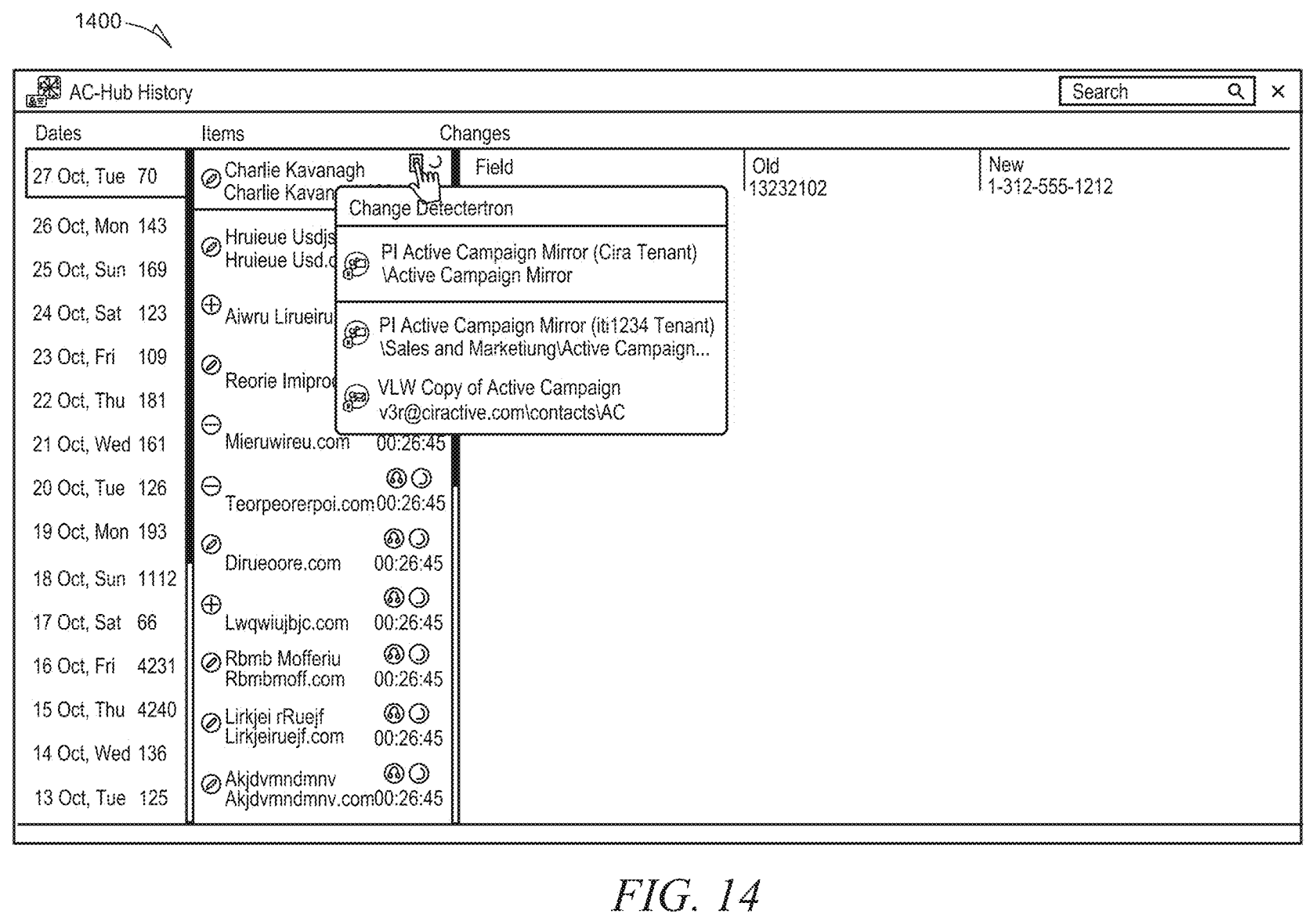

FIG. 14 is screenshot of an example dynamic graphical user interface for viewing or modifying a history of change logs corresponding to synchronization of data items between a hub and one or more spokes. In example embodiments, the synchronization logs are organized into periods of time (e.g., days) in a first pane. A number of synchronization actions taken in each time period may also be listed. By clicking on a period of time (e.g., "27 October, Tue"), summary information for data items corresponding to the time period may be listed in a second pane. Each summary listed in the second pane may be associated with additional user interface elements for viewing information pertaining to the corresponding change, including on which spoke the change was detected and which spokes the change has been synchronized to. In example embodiments, spokes to which the change have not yet been synchronized (e.g., based on the spokes being disconnected, turned off, or simply not yet processed) are listed as pending. An additional user interface element may be associated with each data item to force a synchronization of the data item across the spokes (e.g., moving its priority to the top of a synchronization processing queue).

FIG. 15 is a screenshot of an example dynamic graphical user interface for viewing a detailed change log corresponding to a history of synchronization actions taken with respect to one data item in the history of change logs. As depicted, each change to contact information associated with a contact is depicted over a timeline diagram (e.g., starting from the bottom of the screen and moving up). In example embodiments, some of the descriptions corresponding to each change may appear on either side of the timeline. Thus, for example, the descriptions may alternate between sides as they move up the timeline. As depicted, for the particular selected data item (e.g., a contact data item), new fields may be added or existing fields may be changed or removed. Each change, whether it is the addition of a new field, a removal of an existing field, or a change to an existing field, is documented in the descriptions and presented along the timeline in order of occurrence. Each of the descriptions may be associated with one or more user interface elements for backing out the change or modifying the change, as well as for causing any edits to be synchronized with the hub and/or any other spokes to which the changes apply. In example embodiments, this fine-grained control of the change logs is presented in a compact fashion, as described, such that it is suitable for use on mobile devices.

Figure 16:
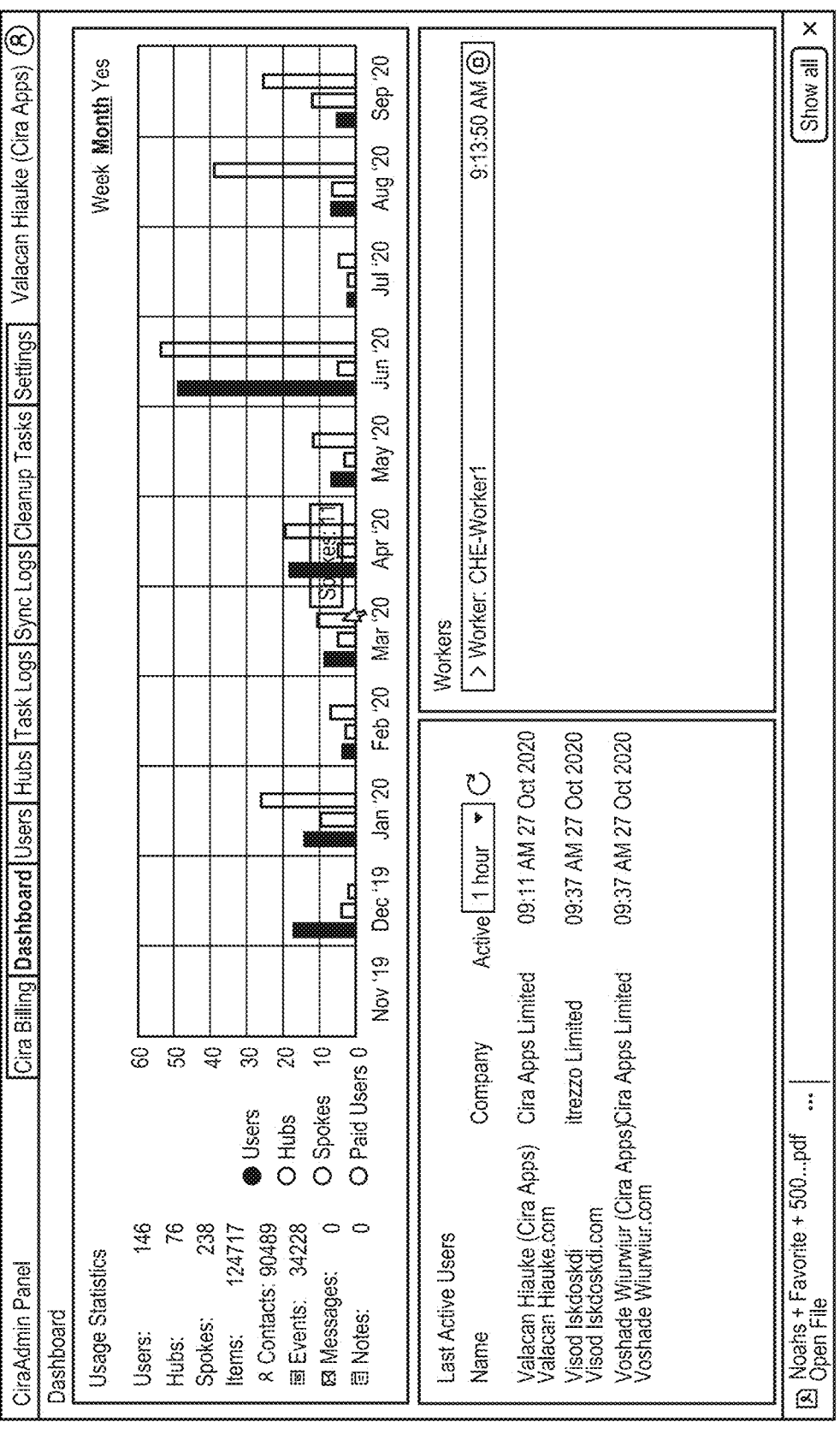
FIG. 16 is a screenshot of an example dynamic graphical user interface of a dashboard of an administration panel corresponding to the hub-and-spoke synchronization architecture.

FIG. 16 is a screenshot of an example dynamic graphical user interface of a dashboard of an administration panel corresponding to the hub-and-spoke synchronization architecture. In example embodiments, as depicted, various panes may be provided for various data, such as panes for usage statistics, last active users, and workers. In example embodiments, the usage statistics may include a number of users (including paid or non-paid users), hubs, spokes, and data items. Additionally, in example embodiments, a number of contacts, events, messages, or notes may be listed. The usage statistics may be accompanied by one or more graphs, which may be dynamically adjusted in the user interface (e.g., to show the data by different time periods, such as week, month, or year). The last active users may show the users by company and may be configurable to list only those users active within a particular time period (e.g., 1 hour). In example embodiments, a user interface element may be provided to immediately update the last active users pane (and/or data in one or more of the other panes). In example embodiments, the workers pane may include a list of workers currently executing synchronization tasks. In example embodiments, data pertaining to each of the workers may include, for example, an amount of data left to be synchronized by the worker and/or a number of spokes left to be synchronized by the process. In example embodiments, a user interface may be provided to pause, stop, or start a worker with respect to the worker's synchronization tasks.

FIG. 17 is a screenshot of an example dynamic graphical user interface for viewing or modifying a listing of hubs in an administration panel corresponding to the hub-and-spoke synchronization architecture. In example embodiments, the listing of hubs may be dynamically updated in at least near real-time as synchronization workers complete synchronization tasks. Thus, for example, real-time data presented for each hub may indicate a current number of pending items awaiting synchronization and a number of items synchronized. Additionally, the hub listing may show a number of spokes associated with each hub, an owner of each hub, a number of data items owned by the owner of each hub, a source type of data items stored in the hub (e.g., calendar or contact data items), and so on.

Figure 18:
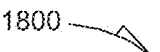
FIG. 18 is a screenshot of an example dynamic graphical user interface for viewing details of a single data item that is available for synchronization in the hub-and-spoke synchronization architecture.

FIG. 18 is a screenshot of an example dynamic graphical user interface for viewing details of a single data item that is available for synchronization in the hub-and-spoke synchronization architecture. As shown, the data item may have a unique identifier for itself as well as for its replicas on a hub and a spoke. Additionally, the data item may have a display name, a set of categories to which it belongs, and an email address (e.g., of an owner of the data item).

Figure 19:
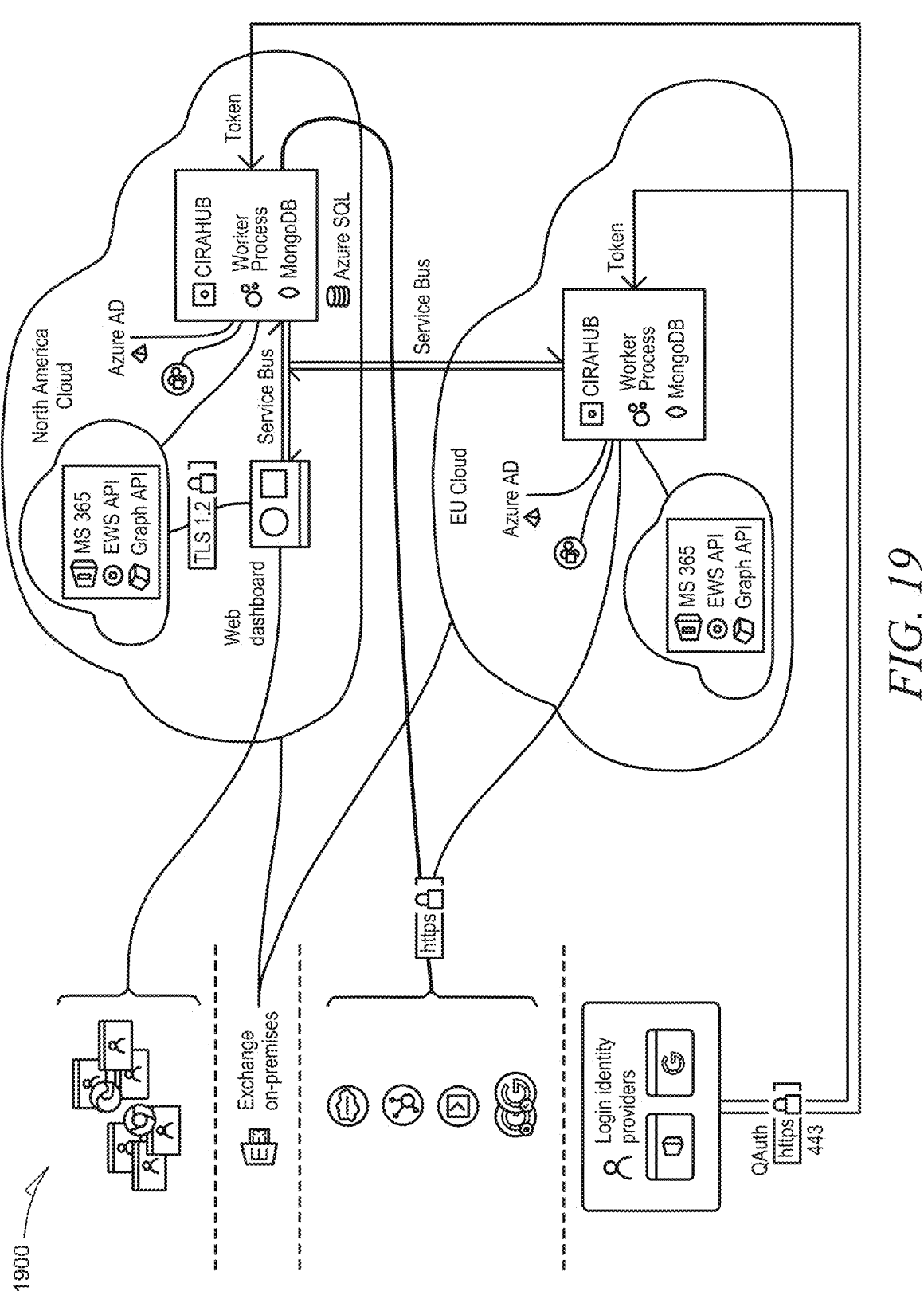
FIG. 19 is a block diagram of an example architecture of a cloud-based hub-and-spoke synchronization system.

FIG. 19 is a block diagram of an example architecture of a cloud-based hub-and-spoke synchronization system. In example embodiments, various user interfaces described herein, such as the dashboard user interface, are accessible to a device of an administrator or end user, such as a mobile phone of the end user. In example embodiments, the web user interfaces are hosted in one or more cloud environments. Storage of data items in the hubs may be distributed to an appropriate cloud (e.g., based on geography). For example, users or administrators of a system associated with the European Union may have all of their hub data stored in a cloud associated with the European Union. Thus, for example, data storage requirements of a particular geographical region or jurisdiction may be satisfied. In example embodiments, the geographic cloud may be specified by an administrator or end user as part of the hub creation process. In example embodiments, users and administrators are authenticated (e.g., via OAuth or other appropriate authentication method).

The worker processes implementing the synchronizations in the hub-and-spoke architecture may execute within the appropriate geographical cloud to perform synchronization tasks in near real-time between spokes using the hub-and-spoke architecture. Computing resources may be allocated within the cloud on demand to satisfy one or more performance requirements of the system, such as a maximum amount of latency or a maximum amount of synchronization time (e.g., per data item, per hub, or per spike). In example embodiments, the worker processes may interface with one or more database systems deployed in the cloud, such as a MongoDB database system. In example embodiments, on-premise solutions may be integrated with the cloud systems to enable the on-premise solutions to use at least some features of the cloud-based system, such as the user interface. In example embodiments, secure HTTP connections may be used to transmit data between various endpoints, including endpoints having different source types, including Microsoft Exchange, Hubspot, Active Campaign, Google (individual users and/or GSuite users), and so on.

In example embodiments, various users and administrators access the disclosed user interfaces based on their assigned roles and access privileges. In other words, different people may have different levels of access to the hub and/or the spokes connected to the hub. Thus, for example, an IT administrator may be able to create hubs and spokes and manage access to them by other users (e.g., to share them with admins), but may not be able to see a CEO's calendar (depending on whether their role matches the access privileges for the calendar). People with appropriate specified roles may be able to perform one or more functions, such as add/remove spokes; add users to be administrators; add/remove filters; edit data in hub (e.g., changing an item, deleting an item, adding an item), extend a contract, create a contract, and so on. In example embodiments, access levels for a particular user or account are based on permissions associated with the account, including a scope of the permissions (e.g., whether the user can manage a spoke, hub, account, or an entire organization). In example embodiments, for hubs associated with a managing entity (e.g., a corporation), the system may be configured such that IT administrators automatically become administrators of all hubs and/or "workgroups"/hubs.

In example embodiments, any user can set up a hub. And even if a user does not have IT delegation privileges for other users, that user can invite those other users to participate in the hub. In other words, in example embodiments, the system may be configured to allow a user to set up and configure a hub, with any administrative settings that would disallow such an action being automatically overridden. Furthermore, the system may be configured to allow even users without specific IT roles and/or permissions to delegate access to the hub. Thus, for example, any user may be able to access user interfaces and commands for setting up and configuring the hub and may initiate or respond to prompts to invite other users to participate in the hub.

An Accordion Spokes system or architecture may be included that enhances the flexibility and/or efficiency of the hub-and-spoke synchronization system by addressing several technical challenges in cloud-based synchronization. This approach introduces the concept of collections as the foundation for dynamic spoke management. Collections can include various types of data sources, such as individual mailboxes, groups, nested collections, and exclusions. The system interfaces with external directory services to retrieve membership information, analyze hierarchical relationships, and/or construct nested collections automatically. Metadata for each collection member, including ownership information and/or synchronization permissions, is stored to facilitate efficient management.

Based on these collections, the system automatically generates spokes corresponding to each member. This process involves continuous monitoring of collection membership changes using real-time event notifications from external directory services. As members are added or removed, the system creates or terminates spokes accordingly, updating the hub's internal data structures to maintain efficient routing of synchronization data.

The Accordion Spokes architecture implements a sophisticated personalized synchronization mechanism for each spoke. This process retrieves data items from the hub, applies filters based on member-specific properties, and synchronizes only the necessary changes. A real-time change log tracks all synchronization actions, ensuring data consistency and enabling efficient conflict resolution.

The system's dynamic updating capability allows it to adapt automatically to organizational changes without manual intervention. It continuously monitors for collection modifications, creates new spokes for added members, terminates spokes for removed members, and propagates relevant changes across the network. This approach ensures that the synchronization structure remains current and efficient, even in rapidly changing environments.

To enhance data security and comply with privacy regulations, the Accordion Spokes system implements data obfuscation techniques. Sensitive information is obfuscated before synchronization, and the system selectively reveals this data based on user roles and permissions. This feature ensures that only authorized users can access sensitive information, adding an extra layer of security to the synchronization process.

The system also includes a sophisticated conflict resolution mechanism to handle simultaneous changes to the same data item across multiple spokes. When conflicts are detected, the system attempts to resolve them automatically. For unresolved conflicts requiring manual intervention, the system generates alerts, allowing administrators to address these issues promptly. This approach ensures data integrity across the entire synchronization network, even in complex, multi-user environments.

The concept of "Accordion Spokes" addresses several technical problems in the prior art of cloud-based synchronization systems and provides innovative solutions to enhance the efficiency and flexibility of the hub-and-spoke architecture. In conventional synchronization solutions, connecting and managing multiple endpoints often requires setting up and maintaining individual two-way synchronization partnerships, which can be cumbersome and time-consuming, especially for large organizations with dynamic user bases.

Additionally, these systems typically lack the ability to easily adapt to changes in organizational structure, such as when employees join or leave the company.

The Accordion Spokes feature introduces a dynamic spoke management system that automatically adds or removes spokes based on membership in a collection. This collection may be constructed from groups or email distribution lists, for example, allowing for a more flexible and scalable approach to synchronization.

The system supports various types of members within a collection, including individual members (such as mailboxes on Google Workspace or Microsoft 365), groups (like distribution lists or security groups), nested collections, and exclusions. This versatility enables organizations to create complex, hierarchical structures that accurately reflect their organizational makeup.

Individual members, which can be specific mailboxes on platforms like Google Workspace or Microsoft 365, form the most basic unit of a collection. For instance, a collection might include "[john@company.com] (mailto: john@company.com)" as an individual member, allowing for precise control over synchronization for specific users.

Groups represent another type of member in the Accordion Spokes system. These can take the form of distribution lists, security groups, or teams. An example is an "All Sales" distribution list. When added to a collection, this group may automatically include all members of the sales team, which could potentially encompass 100 or more sales representatives. This approach allows for efficient management of large teams, as the system automatically adjusts to changes in group membership without requiring manual intervention.

The architecture also supports nested collections, enabling the creation of complex hierarchical structures. This feature is particularly useful for organizations with multi-tiered structures. For example, a "Management" collection could include both the "Executive Team" collection and the "Middle Management" collection. This nesting capability allows for granular control over synchronization while maintaining organizational hierarchy.

Exclusions may be used in fine-tuning collections within the Accordion Spokes system. They provide a powerful mechanism for customizing synchronization rules and access rights. Individual exclusions allow for the removal of specific users from a broader collection. For instance, in a collection based on the "All Executives" distribution list, an individual like "[john@company.com] (mailto: john@company.com)" could be excluded, ensuring that John does not receive certain synchronized data despite being part of the executive group.

Group exclusions offer a way to remove entire sets of users from a collection. the system allows for scenarios such as excluding an "Interns Group" from an "All Staff" collection, effectively synchronizing data for all staff members except those classified as interns. This feature is particularly useful for managing access to sensitive information across large organizations.

The system's flexibility extends to more complex exclusion scenarios, such as nested exclusions. As an example, in an "All Employees" collection, a "Temporary Staff" group could be excluded, but with a further exclusion for "Senior Temporary Staff" within that exclusion. This intricate setup would result in synchronization for all employees except temporary staff, while still including senior temporary staff.

Role-based exclusions demonstrate the system's adaptability to specific business needs. For example, in a sales team context, a collection might be set up for "All Sales Team" with an exclusion for "Junior Sales Representatives." This configuration ensures that junior sales representatives don't receive certain sensitive contact information, allowing for appropriate data access based on seniority or role within the organization.

In example embodiments, the managing these exclusions is implemented to be a user friendly. For example, administrators can utilize the system's interface to easily modify collections, using actions like right-clicking to exclude specific members or groups. This intuitive approach to managing complex synchronization rules significantly enhances the system's usability, allowing for quick adjustments as organizational needs evolve.

The Accordion Spokes system's support for these varied member types and exclusion mechanisms provides organizations with a powerful tool for precise control over data synchronization. By allowing for the creation of dynamic, hierarchical collections with granular exclusion rules, the system ensures that each spoke receives only the appropriate data, adapting automatically to changes in organizational structure and maintaining efficient synchronization across large and complex teams.

One of the key technical solutions provided by Accordion Spokes is its ability to automatically update the synchronization structure as changes occur within the organization. For instance, when executives or other members are hired or fired, the collection is automatically updated, ensuring that the spokes connected to the hub remain current without manual intervention.

This real-time adaptation significantly reduces the administrative overhead associated with maintaining synchronization setups in dynamic environments.

Furthermore, the Accordion Spokes concept introduces a sophisticated filtering mechanism that allows for personalized synchronization of contacts based on the target mailbox.

This granular control over content distribution addresses the problem of over-synchronization, where users receive unnecessary or irrelevant data. In a sales team scenario, for example, each sales representative would receive only the contacts for which they are the account owner, ensuring that the quantity and content of contacts may differ for every single spoke.

The system also incorporates an advanced exclusion mechanism, allowing administrators to exclude specific members or groups from a collection through a user interface.

This feature provides a solution to the common problem of managing exceptions in large-scale synchronization setups, where certain users or groups may require different synchronization rules or access levels.

To address the challenge of maintaining consistency across online and offline spokes, the Accordion Spokes system implements a real-time update mechanism. Changes to the collection are reflected nearly instantaneously for spokes that are online, while offline spokes are updated as soon as they reconnect to the system.

This approach ensures that all endpoints remain synchronized, regardless of their connectivity status.

The Accordion Spokes feature also tackles the issue of conflict resolution, which is a common problem in multi-endpoint synchronization systems. By implementing a configurable collision interval window (with a default of, for example, 60 seconds), the system can detect and manage situations where the same item is changed by two users at different spokes simultaneously.

This mechanism helps maintain data integrity and provides a structured approach to resolving conflicting updates.

From an administrative perspective, the Accordion Spokes concept introduces a comprehensive dashboard interface that allows administrators to manage collections, view synchronization status, and configure various options.

This centralized control panel addresses the problem of fragmented management interfaces in traditional synchronization systems, providing a more efficient and user-friendly approach to overseeing large-scale synchronization operations.

The scalability of the Accordion Spokes system is another significant technical advancement. It is designed to handle large numbers of users efficiently. This scalability may be important for enterprise-level deployments where thousands of users may need to be synchronized across multiple endpoints.

The Accordion Spokes concept provides a comprehensive set of technical solutions to address the limitations of traditional synchronization systems. By introducing dynamic spoke management, personalized content distribution, automatic updates, conflict resolution, and scalable administration, this innovation significantly enhances the capabilities of the hub-and-spoke architecture for cloud-based synchronization.

Various modules for implementing the Accordion Spokes feature may be integrated with the previously-described modules, enhancing or extending their functionality to support dynamic, large-scale synchronization scenarios.

A Collection Management Module may work in conjunction with the hub creation module and spoke connection module. It will extend their capabilities by introducing the concept of collections, which can include individual members, groups, nested collections, and exclusions. This module may interface with external directory services to retrieve and monitor group memberships and distribution lists, providing a more flexible approach to organizing synchronization endpoints.

A Dynamic Spoke Creation/Removal Module may enhance the functionality of the existing spoke connection and disconnection modules. While the original modules handled manual connection and disconnection of spokes, this module will automate the process based on changes in collection membership. It will monitor collections for changes and trigger the creation or removal of spokes accordingly, ensuring that the hub-and-spoke structure remains up-to-date with organizational changes.

A Personalized Content Filter Module may extend the synchronization module. It may add a layer of sophisticated filtering to determine which items should be synchronized to each spoke based on contact properties and user roles. This enhancement may allow for more granular control over synchronized data, addressing the need for personalized content distribution.

A Real-time Update Propagation Module may build upon the existing change log module and synchronization module. It may extend their functionality to handle the dynamic nature of Accordion Spokes, ensuring that changes are reflected promptly for online spokes and as soon as possible for offline spokes. This module may enhance the system's ability to maintain consistency across a dynamic set of endpoints.

A Conflict Detection and Resolution Module may enhance the existing change log module and synchronization module by implementing a collision interval window mechanism. This addition may help manage conflicts when simultaneous changes occur at different spokes, maintaining data integrity across the dynamic spoke structure. It will work closely with the existing modules to ensure that conflict resolution is integrated seamlessly into the synchronization process.

A Enhanced Administrative Interface Module may expand upon the existing dynamic graphical user interface module. It may provide new interfaces for managing collections, configuring Accordion Spokes, and visualizing the dynamic spoke structure. This module will integrate with the various dashboard components, offering administrators comprehensive control and monitoring capabilities for the Accordion Spokes system.

A Scalability Management Module may work in tandem with existing database and synchronization components to implement optimizations such as caching mechanisms, batch processing of updates, and efficient database queries. It may enhance the system's ability to handle large numbers of dynamic spokes efficiently.

A Spoke Ownership Tracking Module may extend the metadata storage capabilities described herein. It may keep track of item ownership across dynamically changing spokes, working closely with the existing synchronization and change log modules to manage the lifecycle of items as spokes are added or removed.

One or more of these modules may enhance the capabilities of the existing hub-and-spoke architecture, allowing it to handle dynamic, large-scale synchronization scenarios while maintaining the system's overall integrity and performance.

The Accordion Spokes architecture can be effectively applied to sales team contact synchronization, providing a dynamic and efficient solution for managing contacts across a large, changing sales organization. Here's an example of how it could be implemented:

In a sales team scenario, the Accordion Spokes system could be set up with a collection based on an "All Sales" distribution list.

This collection may automatically include all members of the sales team, which could potentially be 100 or more sales representatives.

For each sales representative in the collection, the system may automatically create and manage a spoke.

This dynamic spoke creation ensures that as new sales representatives join the team, they are immediately integrated into the synchronization system without manual intervention.

The Personalized Content Filter Module may play a role in this scenario. It may be configured to filter contacts based on account ownership.

This means that each sales representative's spoke may receive exactly all of the contacts where they are the owner of the account. This personalized synchronization ensures that sales representatives have access to only the most relevant contacts for their work, reducing information overload and improving efficiency.

As the sales team structure changes over time—with representatives joining, leaving, or changing roles—the Dynamic Spoke Creation/Removal Module may automatically adjust the spoke structure.

For instance, if a sales representative leaves the company, their spoke may be automatically removed, ensuring that they no longer have access to the synchronized contacts.

The Real-time Update Propagation Module may ensure that any changes to contacts are quickly reflected across the system.

For example, if a sales representative updates a contact's information while on a client visit, this change may be synchronized to the hub and then propagated to any other relevant spokes in near real-time.

The Conflict Detection and Resolution Module may be used in a sales environment where multiple team members might be updating contact information simultaneously.

If two sales representatives attempt to update the same contact within the collision interval window (default of 60 seconds, for example), the system may detect this conflict and alert the designated hub contacts, allowing for prompt resolution.

The Enhanced Administrative Interface Module may provide sales managers with a comprehensive view of the synchronization status across the entire sales team.

They may monitor which sales representatives have the most active contacts, track synchronization issues, and manage access rights as team roles change.

This implementation of Accordion Spokes for sales team contact synchronization addresses several key challenges in sales operations:

1. It ensures that each sales representative always has the most up-to-date and relevant contact information.
2. It automatically adapts to changes in team structure without requiring manual reconfiguration.

3. It provides personalized contact lists for each sales representative, improving efficiency and data relevance.

4. It offers robust conflict resolution for a fast-paced environment where multiple updates are common.

5. It gives sales managers powerful tools for overseeing and managing contact synchronization across the entire team.

By leveraging the dynamic and flexible nature of Accordion Spokes, sales organizations can significantly improve their contact management processes, leading to better coordination, more accurate customer data, and ultimately, improved sales performance.

The user interface for Accordion Spokes may build upon the existing dynamic graphical user interface described in the continuation application, with several new features and enhancements to support the dynamic nature of Accordion Spokes.

The Accordion Spokes user interface may include a visual representation of the collections and their associated spokes. This may be implemented, for example, as an interactive tree-like structure or a nested list view, allowing administrators to easily visualize the hierarchy of collections, groups, and individual members.

The interface may include a section for creating and managing collections. This may include a form or wizard-style interface for adding new collections, specifying their types (e.g., individual members, groups, nested collections), and setting up exclusions. For example, there might be a dropdown menu to select the collection type, followed by fields to enter specific members or select existing groups.

For managing existing collections, the interface may provide options to edit, delete, or view details of each collection. When viewing a collection, the interface may display the current members and any exclusions. It may also show real-time updates as members are added or removed from the underlying groups or distribution lists.

The user interface may include a section for monitoring the status of Accordion Spokes. This may be implemented as a dashboard view, showing key metrics such as the number of active spokes, pending synchronizations, and/or any conflicts or errors. The dashboard might include charts or graphs to visualize synchronization activity over time.

To support the personalized content filtering feature of Accordion Spokes, the interface may provide controls for setting up and managing filters. This may include a rule-based interface where administrators can define criteria for which contacts should be synchronized to specific spokes or collections.

The conflict detection and resolution feature may be represented in the user interface through alerts or notifications. When a conflict is detected within the collision interval window, the interface may display details of the conflict and provide options for resolving it, such as choosing which version to keep or manually merging the changes.

For large-scale deployments, the interface may include features to support efficient management of numerous spokes. This may include search and filter functionality to quickly locate specific spokes or collections, as well as bulk action capabilities for applying changes to multiple spokes simultaneously.

The user interface may provide access to detailed logs and history for each spoke and collection. This may be implemented, for example, as a timeline view, showing all synchronization actions, changes to collection membership, and any manual interventions or conflict resolutions.

To support the dynamic nature of Accordion Spokes, the interface may incorporate real-time updates. For example, when a new member is added to a group, the interface may immediately reflect this change in the relevant collection view without requiring a manual refresh.

The interface may include robust role-based access controls. This may allow organizations to define different levels of access for various administrators, ensuring that users only have access to the collections and spokes relevant to their responsibilities.

By implementing these features, the Accordion Spokes user interface may provide administrators with powerful tools for managing dynamic, large-scale synchronization scenarios while maintaining ease of use and clarity in representation of complex hierarchical structures.

The Accordion Spokes system can automatically provision and de-provision spokes based on changes in the organizational structure. For example, when a new employee joins the company and is added to a relevant distribution list or group, the system would automatically create a new spoke for that employee without any manual intervention. Similarly, when an employee leaves the company and is removed from the group, their spoke would be automatically removed.

The Accordion Spoke concept includes the ability to filter target contacts based on the target mailbox. This feature allows for highly personalized synchronization of contacts for each user. For instance, in a sales team scenario, each sales representative's spoke would contain only the contacts for which they are the account owner. This ensures that the quantity and content of contacts may differ for every single spoke, providing each user with precisely the information they need.

Accordion Spokes may be implemented for Calendar Sync and other content types. This feature could provide similar benefits in terms of dynamic, personalized calendar synchronization across an organization, even the variability of content in this context is uncertain.

In example embodiments, the Accordion Spokes concept is designed to handle large-scale deployments efficiently. For example, it can manage a large number of sales people in an "All Sales" distribution list, automatically creating and managing the appropriate number of spokes. To support this level of scalability, the system likely incorporates optimizations such as caching mechanisms, batch processing of updates, and/or efficient database queries.

The system includes a sophisticated conflict resolution mechanism to handle situations where the same item is changed by two users at different spokes simultaneously. It uses a configurable collision interval window (default 60 seconds, for example) to detect potential conflicts. When a conflict is detected, the system can send email alerts to designated hub contacts, providing details of the conflicting changes and allowing for prompt resolution.

In example embodiments, the Accordion Spokes system is designed to reflect changes in near real-time for spokes that are online. This ensures that updates to collections or individual items are propagated quickly across the system, maintaining data consistency and providing users with the most up-to-date information.

For spokes that are offline, the system implements a mechanism to apply changes as soon as they come back online. This feature ensures that all endpoints remain synchronized, regardless of their connectivity status, by checking the change log and playing back any changes that were not recorded while the spoke was offline.

In example embodiments, the Accordion Spokes concept introduces advanced administrative controls through a comprehensive dashboard interface. This interface allows administrators to manage collections, view synchronization status, and configure various options for Accordion Spokes. It provides a centralized control panel for overseeing large-scale synchronization operations, making it easier for administrators to manage complex synchronization scenarios.

A data obfuscation feature may be implemented, such as in the context of managing sensitive data across dynamic spokes. This feature allows for the obfuscation of personally identifiable information, ensuring compliance with data protection regulations like GDPR while still allowing customer support teams to assist users.

In example embodiments, the system incorporates role-based access control for managing Accordion Spokes. This feature allows organizations to define different levels of access for various administrators, ensuring that users only have access to the collections and spokes relevant to their responsibilities. For example, certain administrators might be able to view and edit configurations for specific hubs or spokes, while others may only have view access.

The Accordion Spokes system leverages advanced data structures and algorithms to efficiently manage dynamic collections and spokes. For example, the system may utilize a hierarchical tree structure or other data structure to represent collections, with nodes representing individual data sources, groups, and/or nested collections. This structure allows for efficient traversal and updates when membership changes occur.

For real-time monitoring of collection changes, the system may implement an event-driven architecture. It may establish persistent connections with external directory services using protocols such as LDAP Change Notification Control or Microsoft Graph webhooks. These connections may enable the system to receive immediate notifications when group memberships or distribution lists are modified.

The spoke generation process may employ a factory pattern to create spoke objects dynamically. Each spoke object may encapsulate connection parameters, synchronization metadata, and/or state information. The system may maintain a pool of reusable connection objects to minimize the overhead of establishing new connections when spokes are added or removed.

To optimize performance and resource utilization, the system may implement a lazy loading strategy for spoke data. When a new spoke is created, only essential metadata is initialized. Full data synchronization occurs on-demand or during scheduled synchronization windows, reducing unnecessary data transfer and processing.

The personalized synchronization mechanism may utilize a combination of server-side and client-side filtering. Server-side filtering may be applied at the hub level using parameterized queries to retrieve only relevant data items for each spoke. Client-side filtering further refines the data set based on spoke-specific properties such as account ownership, user role, or custom synchronization rules.

To ensure data consistency and enable efficient conflict resolution, the system may implement a vector clock mechanism. Each data item may be associated with a vector of timestamps, representing the last modification time for each spoke. This allows the system to detect and resolve conflicts by comparing vector clocks during synchronization.

The change log may be implemented as a distributed, append-only log structure, ensuring durability and/or consistency across the system. Each log entry may contain detailed information about the synchronization action, including the affected data item, the nature of the change, and/or the originating spoke. This comprehensive logging enables accurate auditing and facilitates rollback operations if needed.

For data obfuscation, the system may employs a combination of encryption and/or tokenization techniques. Sensitive fields may be encrypted using a strong symmetric encryption algorithm (e.g., AES-256), with keys managed through a secure key management system. Non-sensitive parts of the data may be tokenized using a reversible tokenization algorithm, allowing for efficient searching and filtering of obfuscated data.

The conflict resolution mechanism may utilize a rule-based engine that can be customized to handle various conflict scenarios. The engine applies predefined rules to automatically resolve conflicts when possible. For conflicts requiring manual intervention, the system may generate detailed conflict reports, including the conflicting values, the spokes involved, and the timestamp of each change.

To ensure scalability, the system may employ a distributed architecture with multiple synchronization workers. These workers may operate in parallel, processing synchronization tasks for different spokes concurrently. Load balancing may be achieved through a distributed task queue, which assigns synchronization jobs to available workers based on their current load and capacity.

The system may also implement adaptive throttling to prevent overloading of external services or rate limit violations. It may monitor the response times and error rates of API calls to external services and adjust the synchronization rate accordingly. This ensures optimal performance while maintaining compliance with service provider limitations.

To support the dynamic nature of Accordion Spokes, the system may implement a flexible permission model. This model allows for fine-grained control over synchronization permissions at the collection, group, and/or individual spoke levels. Permissions are stored as bit masks, enabling efficient checking and updating of access rights.

The user interface for managing Accordion Spokes may be built using a reactive framework, ensuring real-time updates as changes occur in the underlying data structures. It may employ a component-based architecture, allowing for modular development and easy customization of the interface.

By implementing these technical details, the Accordion Spokes architecture provides a robust, scalable, and flexible solution for cloud-based synchronization across diverse and dynamic organizational structures. The system's design ensures that it can efficiently handle large numbers of spokes, adapt to frequent changes in collection membership, and provide personalized synchronization while maintaining data security and consistency.

The hub-and-spoke architecture provides a robust framework for synchronizing data across multiple endpoints. A first type of disclosed spokes (e.g., non-according spokes) may be used to represent connections between the hub and individual data sources, such as user mailboxes, public folders, or specific applications.

A second type of spokes, (e.g., accordion spokes) may introduce dynamic and flexible synchronization endpoints that can automatically expand or contract (e.g., based on organizational changes).

Accordion spokes may differ from non-accordion spokes in several ways. While non-accordion spokes typically require manual setup and remain static unless explicitly modified, accordion spokes are automatically generated based on collections of data sources.

These collections can include individual mailboxes, groups, nested collections, or even exclusions. As members are added to or removed from a collection, the system dynamically creates or terminates the corresponding spokes without requiring administrator intervention.

Non-accordion spokes are generally more appropriate for static data sources that require consistent synchronization, such as individual user mailboxes or specific application databases. These spokes provide a reliable connection for ongoing data synchronization between the hub and a fixed set of endpoints.

Accordion spokes, in contrast, are better suited for dynamic organizational structures and data sources that frequently change, such as distribution lists, security groups, or project teams. They excel in scenarios where the set of synchronization endpoints needs to adapt quickly to organizational changes, such as when employees join or leave the company, or when project teams are formed or disbanded.

In a single system, both types of spokes can work together to provide a comprehensive synchronization solution. For example, an organization might use non-accordion spokes for critical, static data sources like executive calendars or company-wide contact lists, while employing accordion spokes for department-specific distribution lists or project team folders.

This combination allows for stable, consistent synchronization of core data alongside flexible, dynamic synchronization of more fluid organizational structures.

The accordion spokes system also introduces advanced features that can benefit the entire synchronization network. These include personalized synchronization mechanisms, which apply filters based on member-specific properties to ensure each spoke receives only the most relevant data.

Additionally, the system may incorporate sophisticated conflict resolution mechanisms and enhanced security features such as data obfuscation and/or fine-grained permission controls. These features can be applied across both types of spokes, improving the overall efficiency, security, and/or adaptability of the synchronization system.

In example embodiments, the system includes one or more of the following features.

Field Mapping: The system includes a field mapping capability that allows for flexible mapping between different data schemas. For example, if Salesforce has a field called "Phone 1" and Outlook has a field called "Business Phone", the system can map these fields to ensure proper synchronization between the two systems. This feature enables seamless integration between disparate systems with different data structures.

Deduplication: The system implements a sophisticated deduplication mechanism to handle duplicate contacts across different spokes. The deduplication process involves reading all contacts from the hub and then looking for duplicate entries. It first checks for matches based on email addresses, then compares other fields like last name and first name. The system can be configured to perform exact deduplication (field-by-field comparison with 100% match) or fuzzy deduplication, where an operator is prompted to merge imprecise duplicates through a graphical user interface.

Roles and Permissions: The system incorporates a comprehensive roles and permissions feature. Different users can be assigned various levels of access to hubs and spokes. For example, some users may be able to view and edit configurations for specific hubs or spokes, while others may only have view access. The system supports granular control over permissions, including the ability to view configurations, edit configurations, and view data for each hub and spoke.

Change History and Rollback: The system maintains a detailed change history for each data item. This history is presented in a timeline format, showing all modifications made to a data item over time. Each change entry includes information about what was modified, when it was modified, and which spoke initiated the change. The user interface allows administrators to review these changes and, if necessary, roll back specific modifications. This feature provides a powerful tool for auditing and error recovery.

Real-time Monitoring and Dashboard: The system includes a comprehensive dashboard that provides real-time monitoring of synchronization activities. The dashboard displays various metrics such as the number of users, hubs, spokes, and synchronized items. It also shows active users and current synchronization tasks being performed by worker processes. Administrators can use this dashboard to monitor system health, track usage statistics, and identify any issues that require attention.

Geographic Data Distribution: The system supports storing data in different geographic regions to comply with data residency requirements. For example, data for users in the European Union can be stored in EU-based cloud infrastructure. This feature helps organizations meet regulatory requirements for data storage and processing.

These features complement the accordion spokes architecture, providing a comprehensive and flexible synchronization solution that can adapt to various organizational needs and compliance requirements.

Example Mobile Device

Figure 20:
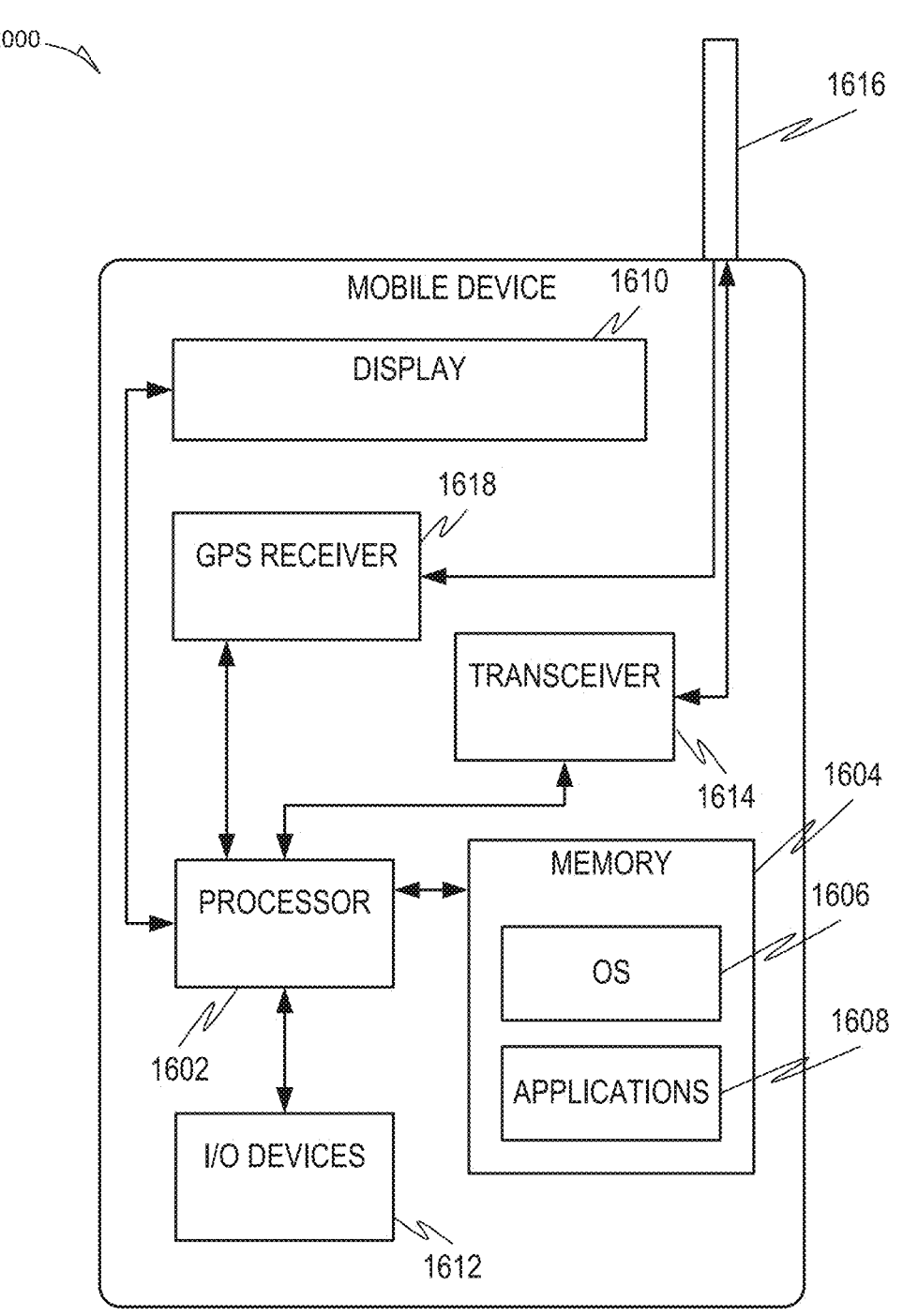
FIG. 20 is a block diagram illustrating a mobile device, according to an example embodiment.

FIG. 20 is a block diagram illustrating a mobile device 2000, according to an example embodiment. The mobile device 2000 can include a processor 1602. The processor 1602 can be any of a variety of different types of commercially available processors suitable for mobile devices 2000 (for example, an XScale architecture microprocessor, a Microprocessor without Interlocked Pipeline Stages (MIPS) architecture processor, or another type of processor). A memory 1604, such as a random access memory (RAM), a Flash memory, or other type of memory, is typically accessible to the processor 1602. The memory 1604 can be adapted to store an operating system (OS) 1606, as well as application programs 1608, such as a mobile location-enabled application that can provide location-based services (LBSs) to a user. The processor 1602 can be coupled, either directly or via appropriate intermediary hardware, to a display 1610 and to one or more input/output (I/O) devices 1612, such as a keypad, a touch panel sensor, a microphone, and the like. Similarly, in some embodiments, the processor 1602 can be coupled to a transceiver 1614 that interfaces with an antenna 1616. The transceiver 1614 can be configured to both transmit and receive cellular network signals, wireless data signals, or other types of signals via the antenna 1616, depending on the nature of the mobile device 2000. Further, in some configurations, a GPS receiver 1618 can also make use of the antenna 1616 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 21:
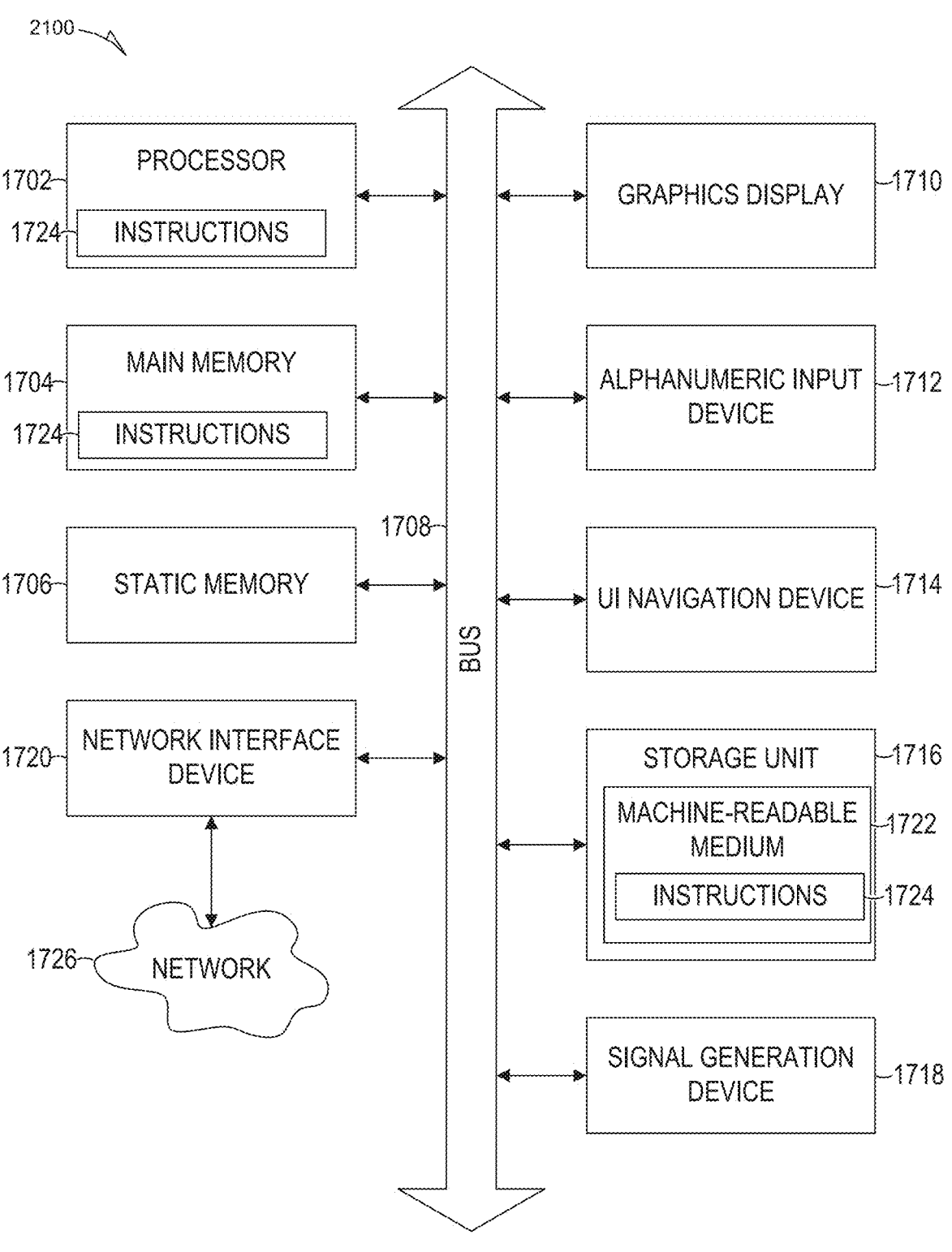
FIG. 21 is a block diagram of machine in the example form of a computer system within which instructions for causing the machine to perform any one or more of the methodologies discussed herein may be executed.

FIG. 21 is a block diagram of an example computer system 2100 on which methodologies and operations described herein may be executed, in accordance with an example embodiment. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2100 includes a processor 1702 (e.g., a central processing unit (CPU), a graphics processing unit (GPU) or both), a main memory 1704 and a static memory 1706, which communicate with each other via a bus 1708. The computer system 2100 may further include a graphics display unit 1710 (e.g., a liquid crystal display (LCD) or a cathode ray tube (CRT)). The computer system 2100 also includes an alphanumeric input device 1712 (e.g., a keyboard or a touch-sensitive display screen), a user interface (UI) navigation device 1714 (e.g., a mouse), a storage unit 1716, a signal generation device 1718 (e.g., a speaker) and a network interface device 1720.

Machine-Readable Medium

The storage unit 1716 includes a machine-readable medium 1722 on which is stored one or more sets of instructions and data structures (e.g., software) 1724 embodying or utilized by any one or more of the methodologies or functions described herein. The instructions 1724 may also reside, completely or at least partially, within the main memory 1704 and/or within the processor 1702 during execution thereof by the computer system 2100, the main memory 1704 and the processor 1702 also constituting machine-readable media.

While the machine-readable medium 1722 is shown in an example embodiment to be a single medium, the term "machine-readable medium" may include a single medium or multiple media (e.g., a centralized or distributed database, and/or associated caches and servers) that store the one or more instructions 1724 or data structures. The term "machine-readable medium" shall also be taken to include any tangible medium that is capable of storing, encoding or carrying instructions (e.g., instructions 1724) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1724 may further be transmitted or received over a communications network 1726 using a transmission medium. The instructions 1724 may be transmitted using the network interface device 1720 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:

one or more computer processors;

one or more computer memories;

a set of instructions incorporated into the one or more computer memories, the set of instructions configuring the one or more computer processors to perform operations, the operations comprising:

creating a collection of data sources, wherein the collection of data sources includes at least one of an individual data source, a group of data sources, a nested collection, or an exclusion, a nested collection being an additional collection of data sources that is included in the collection of data sources, the exclusion being an additional individual data source or an additional group of data sources that is excluded from the collection of data sources;

automatically generating one or more spokes based on the collection of data sources, wherein each of the one or more spokes corresponds to one or more corresponding members of the collection of data sources;

performing personalized synchronization of one or more data items for each spoke of the one or more spokes, wherein the one or more data items are filtered based on properties specific to the one or more corresponding members of the collection of data sources;

dynamically updating the one or more spokes in response to one or more changes in the collection of data sources, the dynamic updating including adding or removing at least one of the one or more spokes based on one or more modifications to one or more members of the collection of data sources.

2. The system of claim 1, wherein creating the collection of data sources comprises:

interfacing with one or more external directory services to retrieve membership information for one or more groups or distribution lists;

analyzing the retrieved membership information to identify one or more hierarchical relationships between the collection of data sources;

automatically constructing the nested collection based on the identified one or more hierarchical relationships; and storing metadata for each member of the collection of data sources, the metadata including one or more synchronization permissions.

3. The system of claim 1, wherein automatically generating the one or more spokes based on the collection of data sources comprises:

monitoring the collection of data sources for changes in the one or more members using real-time event notifications from external directory services; and updating internal data structures of a hub to reflect a current state of each of the one or more spokes.

4. The system of claim 1, wherein performing personalized synchronization of one or more data items for each spoke comprises:

retrieving a set of data items from a hub associated with the spoke;

applying one or more filters to the set of data items based on the properties specific to the one or more corresponding members of the collection of data sources, wherein the properties include at least one of an account ownership, a user role, or a synchronization permission;

identifying one or more changes between the filtered set of data items and a local copy of data items stored at the spoke;

synchronizing only the identified one or more changes to the spoke, the synchronizing including updating, adding, or removing the one or more data items; and updating a change log in real-time to track one or more synchronization actions performed for each data item.

5. The system of claim 1, wherein dynamically updating the one or more spokes in response to the one or more changes in the collection of data sources comprises:

monitoring the collection of data sources for the one or more changes in the one or more corresponding members using real-time event notifications from external directory services;

for each newly added member to the collection of data sources, creating a new spoke of the one or more spokes by initializing synchronization metadata, establishing connection parameters, and performing an initial synchronization of the one or more data items;

for each removed member from the collection of data sources, terminating a corresponding spoke of the one or more spokes by cleaning up associated data, closing active connections, and removing additional synchronization metadata;

updating internal data structures of a hub to reflect a current state of the one or more spokes, including modifying routing tables and synchronization queues; and propagating relevant changes of the one or more changes to remaining spokes of the one or more spokes.

6. The system of claim 1, wherein the operations further comprise:

applying a data obfuscation technique to sensitive information within the one or more data items before synchronization; and selectively revealing obfuscated data based on user roles and permissions.

7. The system of claim 1, wherein the operations further comprise:

implementing a conflict resolution mechanism to handle simultaneous changes to a data item of the one or more data items across multiple spokes; and generating alerts for unresolved conflicts that require manual intervention.

8. A method comprising:

creating a collection of data sources, wherein the collection of data sources includes at least one of an individual data source, a group of data sources, a nested collection, or an exclusion, a nested collection being an additional collection of data sources that is included in the collection of data sources, the exclusion being an additional individual data source or an additional group of data sources that is excluded from the collection of data sources;

automatically generating one or more spokes based on the collection of data sources, wherein each of the one or more spokes corresponds to one or more corresponding members of the collection of data sources;

performing personalized synchronization of one or more data items for each spoke of the one or more spokes, wherein the one or more data items are filtered based on properties specific to the one or more corresponding members of the collection of data sources;

dynamically updating the one or more spokes in response to one or more changes in the collection of data sources, the dynamic updating including adding or removing at least one of the one or more spokes based on one or more modifications to one or more members of the collection of data sources.

9. The method of claim 8, wherein creating the collection of data sources comprises:

interfacing with one or more external directory services to retrieve membership information for one or more groups or distribution lists;

analyzing the retrieved membership information to identify one or more hierarchical relationships between the collection of data sources;

automatically constructing the nested collection based on the identified one or more hierarchical relationships; and storing metadata for each member of the collection of data sources, the metadata including one or more synchronization permissions.

10. The method of claim 8, wherein automatically generating the one or more spokes based on the collection of data sources comprises:

monitoring the collection of data sources for changes in the one or more members using real-time event notifications from external directory services; and updating internal data structures of a hub to reflect a current state of each of the one or more spokes.

11. The method of claim 8, wherein performing personalized synchronization of one or more data items for each spoke comprises:

retrieving a set of data items from a hub associated with the spoke;

applying one or more filters to the set of data items based on the properties specific to the one or more corresponding members of the collection of data sources, wherein the properties include at least one of an account ownership, a user role, or a synchronization permission;

identifying one or more changes between the filtered set of data items and a local copy of data items stored at the spoke;

synchronizing only the identified one or more changes to the spoke, the synchronizing including updating, adding, or removing the one or more data items; and updating a change log in real-time to track one or more synchronization actions performed for each data item.

12. The method of claim 8, wherein dynamically updating the one or more spokes in response to the one or more changes in the collection of data sources comprises:

monitoring the collection of data sources for the one or more changes in the one or more corresponding members using real-time event notifications from external directory services;

for each newly added member to the collection of data sources, creating a new spoke of the one or more spokes by initializing synchronization metadata, establishing connection parameters, and performing an initial synchronization of the one or more data items;

for each removed member from the collection of data sources, terminating a corresponding spoke of the one or more spokes by cleaning up associated data, closing active connections, and removing additional synchronization metadata;

updating internal data structures of a hub to reflect a current state of the one or more spokes, including modifying routing tables and synchronization queues; and propagating relevant changes of the one or more changes to remaining spokes of the one or more spokes.

13. The method of claim 8, further comprising:

applying a data obfuscation technique to sensitive information within the one or more data items before synchronization; and selectively revealing obfuscated data based on user roles and permissions.

14. The method of claim 8, further comprising:

implementing a conflict resolution mechanism to handle simultaneous changes to a data item of the one or more data items across multiple spokes; and generating alerts for unresolved conflicts that require manual intervention.

15. A non-transitory computer-readable storage medium storing a set of instructions that, when executed by one or more computer processors, causes the one or more computer processors to perform operations, the operations comprising:

creating a collection of data sources, wherein the collection of data sources includes at least one of an individual data source, a group of data sources, a nested collection, or an exclusion, a nested collection being an additional collection of data sources that is included in the collection of data sources, the exclusion being an additional individual data source or an additional group of data sources that is excluded from the collection of data sources;

automatically generating one or more spokes based on the collection of data sources, wherein each of the one or more spokes corresponds to one or more corresponding members of the collection of data sources;

performing personalized synchronization of one or more data items for each spoke of the one or more spokes, wherein the one or more data items are filtered based on properties specific to the one or more corresponding members of the collection of data sources;

dynamically updating the one or more spokes in response to one or more changes in the collection of data sources, the dynamic updating including adding or removing at least one of the one or more spokes based on one or more modifications to one or more members of the collection of data sources.

16. The non-transitory computer-readable storage medium of claim 15, wherein creating the collection of data sources comprises:

interfacing with one or more external directory services to retrieve membership information for one or more groups or distribution lists;

analyzing the retrieved membership information to identify one or more hierarchical relationships between the collection of data sources;

automatically constructing the nested collection based on the identified one or more hierarchical relationships; and storing metadata for each member of the collection of data sources, the metadata including one or more synchronization permissions.

17. The non-transitory computer-readable storage medium of claim 15, wherein automatically generating the one or more spokes based on the collection of data sources comprises:

monitoring the collection of data sources for changes in the one or more members using real-time event notifications from external directory services; and updating internal data structures of a hub to reflect a current state of each of the one or more spokes.

18. The non-transitory computer-readable storage medium of claim 15, wherein performing personalized synchronization of one or more data items for each spoke comprises:

retrieving a set of data items from a hub associated with the spoke;

applying one or more filters to the set of data items based on the properties specific to the one or more corresponding members of the collection of data sources, wherein the properties include at least one of an account ownership, a user role, or a synchronization permission;

identifying one or more changes between the filtered set of data items and a local copy of data items stored at the spoke;

synchronizing only the identified one or more changes to the spoke, the synchronizing including updating, adding, or removing the one or more data items; and updating a change log in real-time to track one or more synchronization actions performed for each data item.

19. The non-transitory computer-readable storage medium of claim 15, wherein dynamically updating the one or more spokes in response to the one or more changes in the collection of data sources comprises:

monitoring the collection of data sources for the one or more changes in the one or more corresponding members using real-time event notifications from external directory services;

for each newly added member to the collection of data sources, creating a new spoke of the one or more spokes by initializing synchronization metadata, establishing connection parameters, and performing an initial synchronization of the one or more data items;

for each removed member from the collection of data sources, terminating a corresponding spoke of the one or more spokes by cleaning up associated data, closing active connections, and removing additional synchronization metadata;

updating internal data structures of a hub to reflect a current state of the one or more spokes, including modifying routing tables and synchronization queues; and propagating relevant changes of the one or more changes to remaining spokes of the one or more spokes.

20. The non-transitory computer-readable storage medium of claim 15, wherein the operations further comprise:

applying a data obfuscation technique to sensitive information within the one or more data items before synchronization; and selectively revealing obfuscated data based on user roles and permissions.

* * * * *